United States Patent
Wu et al.

(10) Patent No.: US 12,539,052 B2
(45) Date of Patent: Feb. 3, 2026

(54) RECONSTRUCTION OF ELECTROCARDIOGRAM FROM PHOTOPLETHYSMOGRAM SIGNALS

(71) Applicant: UNIVERSITY OF MARYLAND, COLLEGE PARK, College Park, MD (US)

(72) Inventors: Min Wu, Clarksville, MD (US); Yuenan Li, Tianjin (CN); Xin Tian, College Park, MD (US); Qiang Zhu, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 1151 days.

(21) Appl. No.: 17/225,817

(22) Filed: Apr. 8, 2021

(65) Prior Publication Data
US 2021/0315470 A1    Oct. 14, 2021

Related U.S. Application Data

(60) Provisional application No. 63/006,796, filed on Apr. 8, 2020.

(51) Int. Cl.
*A61B 5/0295* (2006.01)
*A61B 5/00* (2006.01)
*A61B 5/318* (2021.01)

(52) U.S. Cl.
CPC .......... *A61B 5/0295* (2013.01); *A61B 5/318* (2021.01); *A61B 5/7267* (2013.01)

(58) Field of Classification Search
None
See application file for complete search history.

(56) References Cited

U.S. PATENT DOCUMENTS

2019/0117096 A1 * 4/2019 Rundo .............. A61B 5/02405

OTHER PUBLICATIONS

Zhu et al., "ECG Reconstruction via PPG: A Pilot Study", May 2019, IEEE EMBS International Conference of Biomedical and Health Informatics (BRI), pp. 1-4, IEEE (Year: 2019).*

(Continued)

*Primary Examiner* — Michael R Bloch
(74) *Attorney, Agent, or Firm* — SQUIRE PATTON BOGGS (US) LLP

(57) ABSTRACT

Systems, methods, apparatuses, and computer program products for reconstructing electrocardiogram (ECG) waveforms from photoplethysmogram (PPG) signals using dictionary learning and deep learning for continuous monitoring and analytics. A method may include obtaining an electrical signal of a heart. The method may also include obtaining a circulatory signal related to a pulsatile volume of blood in tissue. The method may further include preprocessing the electrical signal and the circulatory signal. In addition, the method may include learning a mapping from at least one of the preprocessed electrical signal and the preprocessed circulatory signal. Further, the method may include training a model using the mapping. The method may also include deriving cardiovascular data based on the trained model.

11 Claims, 20 Drawing Sheets

(56) References Cited

OTHER PUBLICATIONS

Gupta et al., "Coupled Analysis Dictionary Learning to inductively learn inversion: Application to real-time reconstruction of Biomedical signals", 2018, International Joint Conference on Neural Networks (IJCNN), pp. 1-8, IEEE (Year: 2018).*
Banerjee et al. "PhotoECG: Photoplethysmography to estimate ECG parameters," in Proc. IEEE Int. Conf. Acoust. Speech Signal Process., 2014, pp. 4404-4408 (Year: 2014).*
V—Gupta (Year: 2018).*
Gogna et al., Semi-supervised Stacked Label Consistent Autoencoder for Reconstruction and Analysis of Biomedical Signals, 2017, IEE Transactions on Biomedical Engineering; 64(9), 2196-2205 (Year: 2017).*
Anna Rosiek et al., "The risk factors and prevention of cardiovascular disease: the importance of electrocardiogram in the diagnosis and treatment of acute coronary syndrome", Therapeutics and Clinical Risk Management 2016: 12 1223-1229, 7 pages, Dovepress.
John Allen, "Photoplethysmography and its application in clinical physiological measurement", IOP Publishing, Physiological Measurement 28 (2007) R1-R39, DOI:10.1088/0967-3334/28/3/R01, 40 pages.
Anand Kumar Joshi et al., "A Review Paper on Analysis of Electrocardiogramanal for the Detection of Arrhythmia Abnormalities", International Journal of Advanced Research in Electrical, Electronics and Instrumentation Engineering, vol. 3, Issue 10, Oct. 2014, www.ijareeie.com, doi: 10.15662/ijareeie.2014.0310028, 10 pages.
E. Gil et al., "Photoplethysmography pulse rate variability as a surrogate measurement of heart rate variability during non-stationary conditions", IOP Publishing, Physiological Measurement 31 (2010) 1271-1290, doi: 10.1088/0967-3334/31/9/015, 21 pages.
A. Johansson, "Neural Network for Photoplethysmographic Respiratory Rate Monitoring", Bio-Optics in Medicine, Medical & Biological Engineering & Computing 2003, vol. 41, 242-248, 7 pages.
Eric Chern-Pin Chua et al., "Towards Using Photo-Plethysmogram Amplitude to Measure Blood Pressure During Sleep", Annals of Biomedical Engineering, vol. 38, No. 3, Mar. 2010, pp. 945-954, DOI: 10.1007/s10439-009-9882-z, 10 pages.
Zhilin Zhang et al., "Troika: A General Framework for Heart Rate Monitoring Using Wrist-Type Photoplethysmographic Signals During Intensive Physical Exercise", IEEE Transactions on Biomedical Engineering, vol. 62, No. 2, Feb. 2015, DOI: 10.1109/TBME.2014.2359372, 10 pages.
Rohan Banerjee et al., "PHOTOECG: Photoplethysmography to Estimate ECG Parameters", 2014 IEEE International Conference on Acoustic, Speech and Signal Processing (ICASSP), 5 pages.
Tim Schack et al., "A New Method for Heart Rate Monitoring During Physical Exercise Using Photoplethysmographic Signals", 2015 23rd European Signal Processing Conference (EUSIPCO), 5 pages.
Qiang Zhu et al., "ECG Reconstruction via PPG: A Pilot Study", ResearchGate, https://www.researchgate.net/publication/332630738, Apr. 2019, 5 pages.
Michal Aharon et al., "K-SVD: An Algorithm for Designing Overcomplete Dictionaries for Sparse Representation", IEEE Transactions on Signal Processing, vol. 54, No. 11, Nov. 2006, DOI: 10.1109/TSP.2006.881199, 12 pages.
Darren Craven et al., "Adaptive Dictionary Reconstruction for Compressed Sensing of ECG Signals", EMB, IEEE Journal of Biomedical and Health Informatics, vol. 21, No. 3, May 2017, http://www.ieee.org/publications_standards/publicaitons/rights/index.html, DOI: 10.1109/JBHI.2016.2531182, 10 pages.
Tong Liu et al., "Dictionary learning for VQ feature extraction in ECG beats classification", Expert Systems With Applications 53 (2016) 129-137, www.elsevier.com/locate/eswa, http://dx.doi.org/10.1016/j.eswa.2016.01.031, 9 pages.
Jianchao Yang et al., "Image Super-Resolution Via Sparse Representation", IEEE Transactions on Image Processing, vol. 19, No. 11, Nov. 2010, DOI: 10.1109/TIP.2010.2050625, 13 pages.
Jianchao Yang et al., "Coupled Dictionary Training for Image Super-Resolution", IEEE Transaction on Image Processing, vol. 21, No. 8, Aug. 2012, DOI: 10.1109/TIP.2012.2192127, 12 pages.
Alistair E.W. Johnson et al., "Data Descriptor: MIMIC-III, a freely accessible critical care database", www.nature.com/scientificdata, ScientificData, 3:160035, DOI: 10.1038/sdata.2016.35, May 24, 2016, 9 pages.
Zheng Zhang et al., "A Survey of Sparse Representation: Algorithms and Applications", IEEE Access, published May 6, 2015, DOI: 10.1109/ACCESS.2015.2430359, 41 pages.
Joel A. Tropp et al., "Signal Recovery From Random Measurements Via Orthogonal Matching Pursuit", IEEE Transactions on Information Theory, vol. 53, No. 12, Dec. 2007, 12 pages.
Adriana N. Vest et al., "An open source benchmarked toolbox for cardiovascular waveform and interval analysis", Physiological Measurement 39(2018) 105004 (23 pp), https://doi.org/10.1088/1361-6579/aae021, Institute of Physics and Engineering in Medicine.
Ev Zisselman et al., "A Local Block Coordinate Descent Algorithm for the Convolutional Sparse Coding Model", Nov. 1, 2018, 13 pages.
Sheng Li et al., "Cross-View Projective Dictionary Learning for Person Re-identification", Proceedings of the Twenty-Fourth International Joint Conference on Artificial Intelligence (IJCAI 2015), 7 pages.

\* cited by examiner

Algorithm 1 Cross-domain joint dictionary learning

Input: Training data $X_e$ and $X_p$ of ECG and PPG cycles, Testing data $T_e$ and $T_p$, and sparsity constraints $t_e$, $t_p$

*Training phase:*
Initialization:
- Initialize $\{D_e, D_p\}$ by randomly selecting atoms from the training data.
- Initialize $A_e, A_p$ by solving Eq.(7) with OMP.
- Initialize $W$ by Eq.(6).

while not converged do
- Update $D, A$ by recombining each part of them.
- Sparse coding: compute $A$ in Eq.(7) with OMP. Zero out the smallest nonzero entries in the columns of $A$ if any local sparsity constraint is violated.
- Dictionary update:
  - Update $D_e, A_e$ in Eq.(11) by SVD method illustrated in Eq.(9)(10).
  - Update $D_p, A_p, W$ in Eq.(12) by SVD method illustrated in Eq.(9)(10).

end while

*Testing phase:*
for each sample $t_p^j \in T_p$ do
- Compute sparse code $s_p^j$ of $t_p^j$ under $D_p$ using Eq.(7).
- Calculate $s_e^j = W s_p^j$.
- Compute the reconstructed ECG sample as $r_e^j = D_e s_e^j$, and store it in matrix $R_e$.

end for

Output: $R_e$

FIG. 2

| Disease | Number of patients | Number of cycles |
|---------|-------------------|------------------|
| CHF | 7 | 7075 (20.6%) |
| MI | 7 | 7106 (20.8%) |
| HYPO | 7 | 8281 (24.2%) |
| CAD | 12 | 11781 (34.4%) |
| Total | 33 | 34243 (100%) |

CHF: congestive heart failure  MI: myocardial infarction
HYPO: hypotension  CAD: coronary artery disease

FIG. 4

| Reconstruction Scheme | $\rho$ | | | rRMSE | | |
|---|---|---|---|---|---|---|
| | $\hat{\mu}$ | $\hat{\sigma}$ | med | $\hat{\mu}$ | $\hat{\sigma}$ | med |
| DCT [10] | 0.71 | 0.31 | 0.83 | 0.67 | 0.26 | 0.60 |
| CPDL [27] | 0.74 | 0.31 | 0.85 | 0.63 | 0.35 | 0.56 |
| SCDL [21] | 0.83 | 0.21 | 0.89 | 0.52 | 0.22 | 0.49 |
| CDL [19] | 0.84 | 0.27 | 0.94 | 0.46 | 0.34 | 0.34 |
| XDJDL (proposed) | 0.88 | 0.23 | 0.96 | 0.39 | 0.31 | 0.29 |

FIG. 5

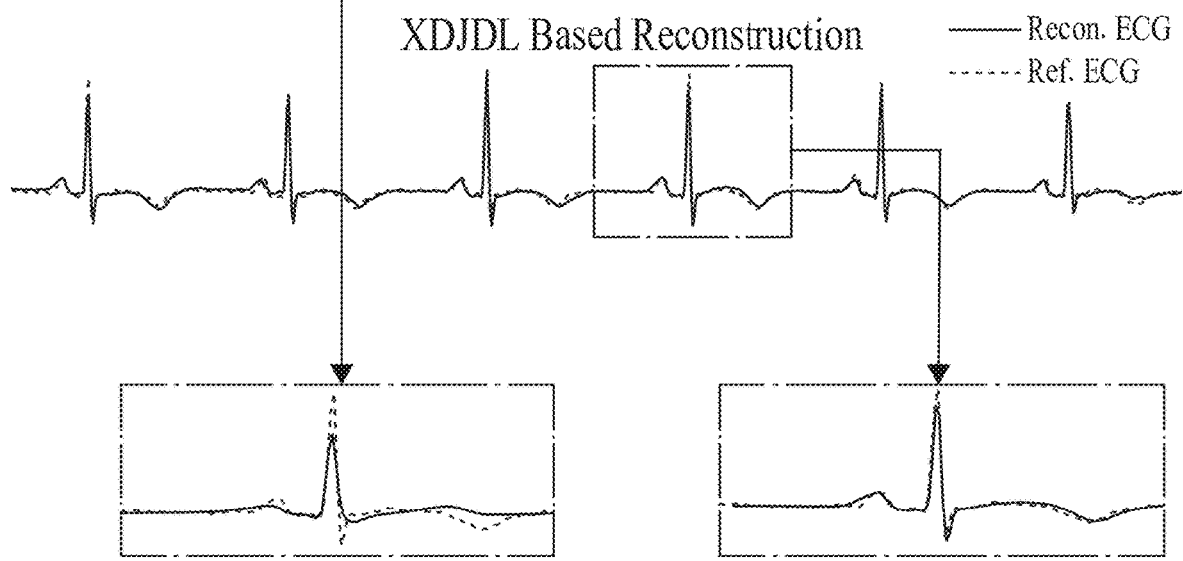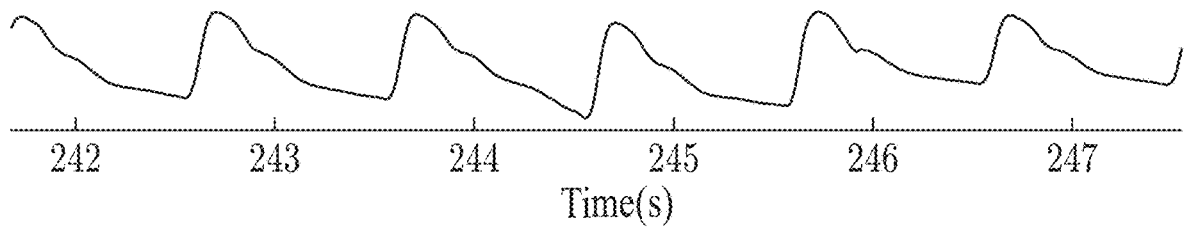
FIG. 7

| Algorithm | $\rho$ | rRMSE |
|---|---|---|
| DCT | 0.71 ± 0.31 | 0.67 ± 0.26 |
| XDJDL | 0.88 ± 0.23 | 0.39 ± 0.31 |
| U-Net | 0.90 ± 0.14 | 0.40 ± 0.19 |
| Proposed | 0.92 ± 0.13 | 0.34 ± 0.18 |

FIG. 9

| CHF | ST-MI | NST-MI | HYPO | CAD | Average |
|---|---|---|---|---|---|
| 0.970 | 0.974 | 0.951 | 0.968 | 0.956 | 0.964 |

FIG. 11

|  | CHF | ST-MI | NST-MI | HYPO | CAD |
|---|---|---|---|---|---|
| CHF | 1342 / 95.4% | 10 / 0.7% | 12 / 0.9% | 12 / 0.9% | 30 / 2.1% |
| ST-MI | 5 / 0.8% | 563 / 95.6% | 2 / 0.3% | 7 / 1.2% | 12 / 2.0% |
| NST-MI | 19 / 2.3% | 6 / 0.7% | 731 / 88.6% | 28 / 3.4% | 41 / 5.0% |
| HYPO | 18 / 1.1% | 10 / 0.6% | 15 / 0.9% | 1551 / 94.2% | 53 / 3.2% |
| CAD | 41 / 1.8% | 28 / 1.2% | 51 / 2.2% | 29 / 1.2% | 2191 / 93.6% |

True CVDs (rows) vs Predicted CVDs (columns)

FIG. 12

| Training Set | $\rho$ | rRMSE |
|---|---|---|
| 10% Paired | $0.91 \pm 0.15$ | $0.37 \pm 0.20$ |
| Fully Paired | $0.92 \pm 0.13$ | $0.34 \pm 0.18$ |

FIG. 13

| Encoder | |
|---|---|
| Conv. Layer | (1, 60, 30, 1) |
| $FEM_1$ | $C_1$ : (60, 40, 15, 1)   $C_2$ : (40, 20, 3, 1) |
| $FEM_2$ | $C_1$ : (60, 40, 5, 1)    $C_2$ : (40, 20, 3, 1) |
| Decoder | |
| $FTM_1$ | $C_1$ : (60, 40, 5, 1)    $C_2$ : (40, 20, 3, 1) |
| $FTM_2$ | $C_1$ : (60, 40, 15, 1)   $C_2$ : (40, 20, 3, 1) |
| ECG Generation Layer | (60, 1, 30, 1) |
| Diagnosis Branch | |
| Attention Gate: Fully-Connected Layers | 240-20-60 |
| Classifer: | |
| Conv. Layer 1 | (60, 30, 30, 2) |
| Conv. Layer 2 | (30, 20, 10, 2) |
| Conv. Layer 3 | (20, 1, 4, 1) |
| Fully-Connected Layers | 53-10-5 |

FIG. 14

| Recursive FEM | $C_1 : (30, 20, 15, 1), C_2 : (20, 10, 3, 1)$ |
|---|---|
| Recursive FTM | $C_1 : (30, 20, 15, 1), C_2 : (20, 10, 3, 1)$ |

FIG. 15

| Encoder | |
|---|---|
| Conv. Layer 1 | (1, 60, 30, 1) |
| Conv. Layer 2 | (60, 40, 5, 1) |
| Conv. Layer 3 | (40, 20, 5, 1) |
| Decoder | |
| Trans. Conv. Layer 1 | (20, 40, 5, 1) |
| Trans. COnv. Layer 2 | (40, 60, 15, 1) |
| ECG Generation Layer | (60, 1, 30, 1) |

FIG. 17

RECONSTRUCTION OF ELECTROCARDIOGRAM FROM PHOTOPLETHYSMOGRAM SIGNALS

CROSS-REFERENCE TO RELATED APPLICATIONS

This application claims priority from U.S. provisional patent application No. 63/006,796 filed on Apr. 8, 2020. The contents of this earlier filed application are hereby incorporated by reference in their entirety.

FIELD

Some embodiments may generally relate to heart actions from pulse. For example, certain example embodiments may relate to apparatuses, systems, and/or methods for reconstructing electrocardiogram (ECG) waveforms from photoplethysmogram (PPG). Other embodiments may use intermediate results of such reconstruction or post-processed result to perform inference on the heart action or health condition.

BACKGROUND

Cardiovascular disease (CVD) has become the leading cause of human death globally. In particular, the World Health Organization has estimated that about 17.9 million people died from CVDs in 2017, representing about 31% of all global deaths. Those life-threatening CVDs often happen outside clinics and hospitals, and the patients are recommended by cardiologists to attend a long-term continuous monitoring program.

The electrocardiogram (ECG) has been a widely-used gold-standard for the cardiovascular diagnostic procedure. By measuring the electrical activity of the heart and conveying information regarding heart functionality, continuous ECG monitoring has been proven to be beneficial for early detection of CVDs. However, most conventional ECG equipment is restrictive on users' activities. Newer clinical ambulatory ECG monitoring devices, such as the Zio patch, have alleviated the above-mentioned issues, although potential skin irritation during long-term adhesive wear remains, especially for people with sensitive skin. Wearable devices alike can show real-time ECG without adhesion to the skin, but generally requires active user participation and is usually for short duration measurement, making it infeasible for long-term continuous ECG monitoring.

As the wearable market continues to grow, photoplethysmogram (PPG) has become a common modality for heart condition monitoring due to its simplicity and low cost. PPG measures the optical response of the blood volume changes at peripheral ends, including ear lobes, wrists, and fingertips, which provides valuable information about the cardiovascular system via daily use of a wrist watch or finger clip oximeter. Compared to ECG, PPG may be more user-friendly in long-term real-time monitoring without constant user intervention.

SUMMARY

Some example embodiments may be directed to a method. The method may include obtaining an electrical signal of a heart. The method may also include obtaining a circulatory signal related to a pulsatile volume of blood in tissue. The method may further include preprocessing the electrical signal and the circulatory signal. In addition, the method may include training a model using a representation and a mapping learned from the preprocessed electrical signal and the preprocessed circulatory signal. Further, the method may include deriving cardiovascular data based on the trained model.

Other example embodiments may be directed to an apparatus. The apparatus may include at least one processor and at least one memory including computer program code. The at least one memory and computer program code may be configured to, with the at least one processor, cause the apparatus at least to obtain an electrical signal of a heart. The apparatus may also be caused to obtain a circulatory signal related to a pulsatile volume of blood in tissue. The apparatus may further be caused to preprocess the electrical signal and the circulatory signal. In addition, the apparatus may be caused to train a model using a representation and a mapping learned from the preprocessed electrical signal and the preprocessed circulatory signal. Further, the apparatus may be caused to derive cardiovascular data based on the trained model.

Other example embodiments may be directed to an apparatus. The apparatus may include means for obtaining an electrical signal of a heart. The apparatus may also include means for obtaining a circulatory signal related to a pulsatile volume of blood in tissue. The apparatus may further include means for preprocessing the electrical signal and the circulatory signal. In addition, the apparatus may include means for training a model using a representation and a mapping learned from the preprocessed electrical signal and the preprocessed circulatory signal. Further, the apparatus may include means for deriving cardiovascular data based on the trained model.

In accordance with other example embodiments, a non-transitory computer readable medium may be encoded with instructions that may, when executed in hardware, perform a method. The method may include obtaining an electrical signal of a heart. The method may also include obtaining a circulatory signal related to a pulsatile volume of blood in tissue. The method may further include preprocessing the electrical signal and the circulatory signal. In addition, the method may include training a model using a representation and a mapping learned from the preprocessed electrical signal and the preprocessed circulatory signal. Further, the method may include deriving cardiovascular data based on the trained model.

Other example embodiments may be directed to a computer program product that performs a method. The method may include obtaining an electrical signal of a heart. The method may also include obtaining a circulatory signal related to a pulsatile volume of blood in tissue. The method may further include preprocessing the electrical signal and the circulatory signal. In addition, the method may include training a model using a representation and a mapping learned from the preprocessed electrical signal and the preprocessed circulatory signal. Further, the method may include deriving cardiovascular data based on the trained model.

BRIEF DESCRIPTION OF THE DRAWINGS

For proper understanding of example embodiments, reference should be made to the accompanying drawings, wherein:

FIG. 2 illustrates an example algorithm for cross-domain joint dictionary learning, according to certain embodiments.

FIG. 4 illustrates a table of a composition of a collected dataset, according to certain embodiments.

FIG. 5 illustrates another table of a comparison of reconstructions in a sample mean ($\hat{\mu}$) and standard deviation ($\hat{\sigma}$) of ρ and relative root mean squared error (rRMSE), according to certain embodiments.

FIG. 7 illustrates a qualitative comparison between reconstructed ECG signals, according to certain embodiments.

FIG. 9 illustrates a table comparing the statistics of quality scores measured from testing algorithms, according to certain embodiments.

FIG. 11 illustrates a table showing disease-specific and average accuracies, according to certain embodiments.

FIG. 12 illustrates a confusion matrix, according to certain embodiments.

FIG. 13 illustrates a table showing a comparison between semi-supervised and supervised ECG inference, according to certain embodiments.

FIG. 14 illustrates a table listing detailed parameter settings of the neural network, according to certain embodiments.

FIG. 15 illustrates a table of parameter settings of a recursive FEM and FTM, according to certain embodiments.

FIG. 17 illustrates a table of U-N parameters, according to certain embodiments.

DETAILED DESCRIPTION

Figure 1:
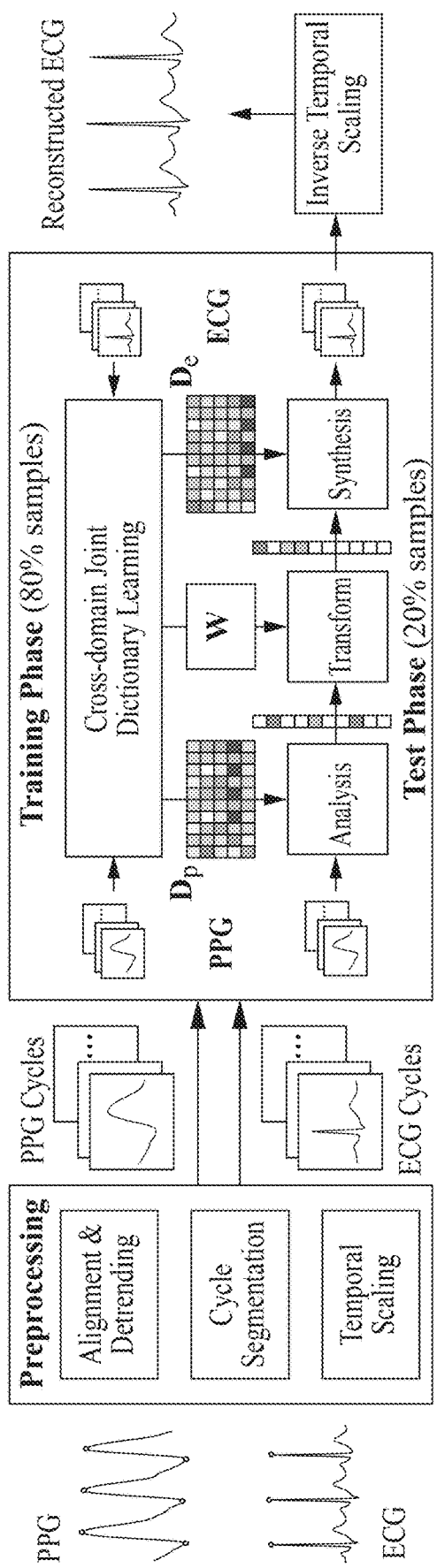
FIG. 1 illustrates a flowchart of an example framework, according to certain embodiments.

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for reconstructing electrocardiogram (ECG) waveforms from photoplethysmogram (PPG) signals using dictionary learning and deep learning for continuous monitoring and analytics.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Additionally, if desired, the different functions or steps discussed below may be performed in a different order and/or concurrently with each other. Furthermore, if desired, one or more of the described functions or steps may be optional or may be combined. As such, the following description should be considered as merely illustrative of the principles and teachings of certain embodiments, and not in limitation thereof.

PPG and ECG are intrinsically related. The peripheral blood volume change may be influenced by the contraction and relaxation of the left ventricle, and these ventricular activities may be controlled by the cardiac electrical signals triggered by the sinoatrial node. Additionally, the wave contour, pulse interval and amplitude characteristics of PPG may provide important information about the cardiovascular system, including heart rate, heart rate variability, respiration, and blood pressure. It may thus be beneficial to consider the inverse problem of reconstructing the ECG signal using a low-cost, user-friendly PPG sensor in a long-term monitoring manner Certain embodiments may provide a dictionary learning framework to demonstrate the feasibility of ECG waveform inference based on artifact-free PPG signal(s). For practical applications, there may be a need for filtering the PPG signal from the motion artifact in the ambulatory condition by, for example, incorporating de-noising to remove PPG artifacts before carrying out the ECG inference.

Additionally, ECG may measure the electrical impulse generated by the depolarization and re-polarization of heart muscle cells, and these activities may be triggered by an electrical stimulus. The stimulus may originate from the sinoatrial node, which is known as the pacemaker of the heart, and it may also coordinate the extraction and relaxation of heart muscle. The stimulus may trigger the depolarization of the two upper chambers (i.e., atria), resulting in the P-wave on ECG. Following the depolarization, the atria muscle contracts and pumps blood into the two bottom chambers (i.e., ventricles). The electrical stimulus may then transmit to the ventricles through the conducting pathway, and the depolarization of ventricles may generate the QRS complex on ECG. As the ventricles contract, blood is ejected out of the heart and flows to the vessels. The increase of blood volume in the vessels may give rise to an ascending slope on PPG. Then the ventricles start to relax, and the T-wave on ECG depicts this phase. At the final stage of a heartbeat, both the atria and ventricles relax, and the pressure within the heart drops rapidly. As a result, blood flows back from the vessels towards the atria, which is represented as a descending slope on PPG.

A machine learning method may estimate ECG parameters from extracted PPG features with about 90% accuracy. However, estimation for certain ECG parameters may be insufficient for the direct ECG screening, and there is still substantial room for improvement in terms of the adaptation to the subject-independent situation where a universal mapping is required for a wider variety of ECG morphologies.

A fundamental limitation to represent both ECG and PPG using a universal dictionary (e.g., DCT) may be the lack of expressive power, especially for a much broader range of signal morphologies representing a large variety of patients. As such, certain embodiments may provide a more representative and adaptive dictionary pair for ECG and PPG that may be learned from the training data. To deploy such a dictionary learning procedure for ECG reconstruction from PPG, certain embodiments may provide solutions for how to jointly learn two dictionaries for different signal measurement domains with a strong representation ability, and solutions for learning an optimized mapping from the sparse representation of PPG to that of ECG with respect to their dictionaries.

Algorithms to learn a single dictionary for better signal representation have been provided. Examples may include the k-singular value decomposition (K-SVD) method, methods of optimal directions, and supervised dictionary learning. In addition, research have suggested that ECG signals may be represented as a sparse linear combination of atoms from an appropriately learned dictionary for ECG classification and compression.

Such signal learning strategies may be extended to joint learning tasks. For example, for image super-resolution, coupled dictionary learning frameworks may be proposed to learn a dictionary pair for low- and high-resolution image patches while enforcing the similarity of their sparse codes with respect to their dictionaries. However, one assumption from this model is that the transform matrix between the two sparse codes may be an identity matrix. This assumption may not be suitable for certain cases, because unlike the super-resolution problem where the input and output reside in the same signal domain and highly correlated, the PPG-to-ECG mapping may span two measurement domains with low waveform correlation and, thus, the similarity constraint on their sparse representations may compromise the generalization of the two learned dictionaries. Thus, considering the difference of the physiological nature between the PPG and ECG signals, a direct deployment of the aforementioned learning methods may fail this cardiovascular inverse reconstruction task.

To address the above-described drawbacks, certain embodiments may provide a cross-domain joint dictionary learning (XDJDL) method for ECG reconstruction from PPG, as illustrated in the example of FIG. 1. In particular, FIG. 1 illustrates a flowchart of an example framework, according to certain embodiments. As illustrated in FIG. 1, the PPG and ECG signals may first be preprocessed into normalized signal cycles to facilitate the subsequent training. In the training phase, the ECG/PPG dictionary pair with good representation capability may be jointly updated with a stable linear mapping that relates the sparse representations of the two measurements. According to certain embodiments, XDJDL may introduce a PPG-to-ECG mapping, which may span the two feature domains with low waveform correlation, providing more flexibility and generalization for the two learned dictionaries. In addition, according to other embodiments, the XDJDL may adopt a joint problem formulation to optimize the capability of the obtained dictionaries for both signal representation and signal transform.

Certain embodiments may enforce that the dictionary pair has a good representation capability and that the sparse representation of ECG and PPG from the same cardiac cycle are related by a stable linear mapping. According to certain embodiments, it may be possible to adopt K-SVD for optimization, which may enable the mapping function to be updated jointly with the dictionary pair, enabling a transform-aware training procedure. The linear transform may reveal the intrinsic relation between atoms of the dictionary pair, showing a potential for preliminary diagnosis.

According to certain embodiments, the XDJDL framework may be evaluated on a subset of a real-world clinical data set including, for example, the MIMIC-III. This sub-dataset may include 34,000+ ECG/PPG cycle pairs with a large variety of ECG morphological patterns collected from different cardiovascular pathologies. In addition, the experimental result shows that XDJDL outperforms the state-of-the-art technique with improvements.

Certain example embodiments may provide synergistic utilization of the advantages of PPG and ECG signals for better preventative healthcare. It may also show the potential of providing a more economical, user-friendly, and long-term cardiac monitoring methodology with a rich knowledge base of the clinical gold-standard ECG.

Certain embodiments of the XDJDL framework described herein may also be implemented independently from, or in conjunction with, certain embodiments of a neural network designed to jointly infer ECG and diagnose cardiovascular diseases (CVDs) from PPG. Certain embodiments of the neural network may also provide optimizations of the XDJDL framework. With the neural network design, it may be possible to minimize memory consumption on mobile devices be devising a model compression procedure for the neural network architecture. Certain embodiments of the neural network may also enable the analysis of the latent connection between PPG and ECG as well as the CVDs-related features of PPG learned by the neural network, and obtain clinical insights from data. Thus, with certain embodiments, it may be possible to produce more accurate ECG inference, and achieve an average $F_1$ score of about 0.96 in diagnosing major CVDs.

As described herein, certain embodiments may leverage deep learning to simultaneously infer ECG and diagnose CVDs from PPG to achieve low-cost, user-friendly, and interpretable continuous cardiac monitoring. As a clinical application of deep learning, certain embodiments may also work to address the issue of model interpretation, and analyze the input-output behaviors of the neural network in both tasks. Thus, certain embodiments provide a multi-task and multi-scale deep architecture for inferring ECG and diagnosing CVDs. Certain embodiments may also address the scarcity of synchronized PPG and ECG pairs by formulating ECG inference as a semi-supervised domain translation problem, and train neural networks to learn the PPG-to-ECG mapping from partially paired data.

In some example embodiments, the per-point contribution of PPG to the two tasks may be quantified, a mobile cardiac monitoring may be facilitated with a lightweight variant of the multi-task and multi-scale deep architecture by pruning insignificant parameters and using recursive layers. Thus, according to some embodiments, the lightweight network may achieve comparable performance as the full network while saving about 78% of parameters.

Preprocessing

Certain embodiments may provide a preprocessing procedure to obtain temporally aligned and normalized cycle pair of ECG and PPG signals, and to facilitate the subsequent learning and evaluation. According to certain embodiments, the preprocessed PPG and ECG signal cycles may be stored in two data matrices denoted as P, E$\in \mathbb{R}^{d \times (n+m)}$, respectively. Each column of P and E may be denoted as $p_i \in \mathbb{R}^{d \times 1}$ and $e_i \in \mathbb{R}^{d \times 1}$, representing one PPG/ECG cycle from the same cardiac cycle.

According to certain embodiments, during preprocessing, ECG and PPG sequences may be aligned according to the moment when the ventricles of the heart contract and the blood flows to the vessels, which corresponds to the R peaks of ECG and the onsets of PPG in the same cycle. Both the onset and R peaks may be detected by the beat detection functions from a PhysioNet Cardiovascular Signal Toolbox or similar tool for calculating heart rate variability (HRV). Then, the aligned signals may be de-trended by a second-order difference operator based algorithm to eliminate the baseline drift related to respiration, motion, vasomotor activity, and change in contact surface. Further, the de-trended PPG and ECG signals may be partitioned into cycles by an R2R segmentation procedure, where the partition points are the R peaks of the ECG signal. After the segmentation, each cycle may be linearly interpolated to length d to mitigate the influence of the heart rate variation. Finally, the amplitude of each cycle may be normalized by subtracting the sample mean and dividing by the sample standard deviation. The preprocessed PPG and ECG signal cycles may be stored in data matrices P and E, respectively.

Cross-Domain Joint Dictionary Learning

In certain embodiments, dictionary learning may discover data distribution effectively. For instance, K-SVD may be an example of dictionary learning. Specifically, K-SVD may include sparse coding based on the current dictionary, and updating the dictionary by an SVD method.

In one example, $X \in \mathbb{R}^{d \times n}$ may be a set of input signals, with each column x, being a training sample. K-SVD may solve the following $L_0$-norm constraint problem in Eq (1):

$$\min_{D,A} \|X - DA\|_F^2 \quad (1)$$

$$s.i. \|a_j\|_0 \leq t_0, j = 1, \ldots, n.$$

where $D \in \mathbb{R}^{d \times k}$, is the reconstructive dictionary with k atoms; $A \in \mathbb{R}^{k \times n}$ is the corresponding sparse codes of X, with each column denoted as $a_j$; and $t_0$ is a sparsity constraint.

The labeled-consistent K-SVD (LC-KSVD) method may follow the K-SVD idea closely for optimization, and make its contribution by leveraging the supervised information of input signals to learn a reconstructive and discriminative dictionary for image classification. To achieve this, LC-KSVD may add two more regularization terms to the objective function in Eq. (1), one for discrimination of the sparse coding, and the other for linear classification.

Certain embodiments may address the ECG inference from PPG by learning a dictionary pair for ECG and PPG along with a linear transform between the sparse representations of the two signals. For instance, according to certain embodiments, the reconstructive dictionary pair may characterize the two structural domains of the two biomedical signals, and the mapping function may reveal the intrinsic relationship between ECG and PPG signals in the sparse domain. In certain embodiments, the linear mapping error may be imposed as one regularization term in the objective function, and then converted to be a problem that can be optimized by the K-SVD dictionary learning method. Details of the model formulation and optimization algorithm are discussed herein.

Certain embodiment may provide the XDJDL model for ECG reconstruction from PPG. For instance, in certain embodiments, let $P=[X_p, T_p] \in \mathbb{R}^{d \times (n+m)}$ and $E=[X_e, T_e] \in \mathbb{R}^{d \times (n+m)}$ be PPG and ECG data sets, respectively. Each column of P and E may be denoted as $p_i \in \mathbb{R}^{d \times 1}$ and $e_i \in \mathbb{R}^{d \times 1}$, representing one PPG/ECG cycle during the same cardiac cycle. An objective of the ECG waveform reconstruction from PPG may be to utilize the training PPG/ECG cycles from $X_p$ and $X_e$ to learn some patterns (dictionaries, mappings, etc.) that may be applied to the testing PPG dataset $T_p \in \mathbb{R}^{d \times m}$ for accurate approximation and inference of testing ECG dataset $T_e \in \mathbb{R}^{d \times m}$.

According to certain embodiments, the XDJDL framework may be formulated as follows:

$$\min_{D_e, A_e, D_p, A_p, W} \|X_e - D_e A_e\|_F^2 + \alpha \|X_p - D_p A_p\|_F^2 + \beta \|A_e - W A_p\|_F^2 \quad (2)$$

$$s.t. \|a_{p,j}\|_0 \leq T_p, \text{ and } \|a_{e,j}\|_0 \leq t_e, j = 1, \ldots, n.$$

where $D_p \in \mathbb{R}^{d \times k_p}$ and $D_e \in \mathbb{R}^{d \times k_e}$ are dictionaries learned from $X_p$ and $X_e$, respectively; $A_p \in \mathbb{R}^{k_p \times n}$ and $A_e \in \mathbb{R}^{k_e \times n}$ are the corresponding sparse coding matrices related with the data matrices $X_p$, $X_e$ when $D_p$, $D_e$ are the current dictionaries. In certain embodiments, each column of $A_p$ and $A_e$ is denoted as $a_{p,j}$ and $a_{e,j}$ with the sparsity upper bounded by $t_p$ and $t_e$, respectively.

In certain embodiments, for the objective function in Eq. (2), $\|X_e - D_e A_e\|_F^2$ and $\|X_p - D_p A_p\|_F^2$ may be the data fidelity terms for ECG and PPG cycle sets, respectively. The term $\|A_e - W A_p\|_F^2$ may represent the mapping error between the sparse coding coefficients of ECG and PPG signals, which enforces the transformed sparse codes of PPG to approximate that of ECG. According to certain embodiments, it may be possible to enforce the two sparse representations for ECG and PPG from the same cycle to be the same, and set the regularization term as $\|A_e - A_p\|_F^2$. However, since ECG and PPG are from two different signal sensing modalities and the waveform difference between the two signals is significant, directly pushing their sparse representations to be similar may compromise the generalization of the two learned dictionaries.

According to certain embodiments, from the formulation in the Eq. (2), it may be possible to jointly learn the dictionaries for ECG and PPG datasets, which may produce a good representation for each sample in the training set with strict sparsity constraints. Meanwhile, in other embodiments, it may be possible to learn the linear approximation of the transform that relates the sparse codes of PPG and ECG, and use it to entail the intrinsic relationship between certain PPG atoms and ECG atoms from their corresponding dictionaries.

In certain embodiments, during optimization, Eq. (2) may be rewritten as:

$$\min_{\substack{D_e, A_e, D_p, \\ A_p, W}} \left\| \begin{pmatrix} X_e \\ \sqrt{\alpha} X_p \\ 0 \end{pmatrix} - \begin{pmatrix} D_e & 0 \\ 0 & \sqrt{\alpha} D_p \\ -\sqrt{\beta} I & \sqrt{\beta} W \end{pmatrix} \begin{pmatrix} A_e \\ A_p \end{pmatrix} \right\|_F^2 \quad (3)$$

$$s.t. \|a_{e,j}\|_0 \leq t_e, \text{ and } \|a_{p,j}\|_0 \leq t_p, j = 1, \ldots, n.$$

where I is an identity matrix and O is a zero matrix, with valid dimensions for matrix multiplication.

Certain embodiments may let $X \triangleq (X_e, \sqrt{a}X_p, 0)^T \in \mathbb{R}^{(2d+k_e) \times n}$, $D \triangleq (D_e, 0, -\sqrt{\beta}I; 0, \sqrt{\alpha}D_p, \sqrt{\beta}W)^T \in \mathbb{R}^{(2d+k_e) \times (k_e+k_p)}$, and $A \triangleq (A_e, A_p)^T \in \mathbb{R}^{(k_e+k_p) \times n}$. The optimization of Eq. (3) may be written as to solve the following problem:

$$\min_{D,A} \|X - DA\|_F^2, \qquad (4)$$

$$\text{s.t. } \|a_{+,j}\|_0 \le t_e, \text{ and } \|a_{-,j}\|_0 \le t_p, j = 1, \ldots, n.$$

where $a_{*,j}$ represents for the column of $A_*$, and $A_+$ is defined as the first $k_e$ rows of sparse matrix A while $A_-$ is the last $k_p$ rows of sparse matrix A. The formulation in Eq. (4) is now similar to Eq. (1), suggesting that K-SVD can be adapted for this optimization. The difference is the local sparsity constraint, which will be addressed in the following optimization procedures.

According to certain embodiments, D and A may be initialized, which may be equivalent to initializing their components: $D_e$, $D_p$, W, $A_e$, and $A_p$. For the $D_e$ and $D_p$, atoms from rom training samples $X_e$ and $X_p$ may be selected. Then, the sparse codes $A_e$ and $A_p$ may be initialized by solving Eq. (7) with respect to $D_e$, $X_e$, $t_e$ and $D_p$, $X_p$, $t_p$, respectively. To initialize W, it may be possible to employ the ridge regression model with a $L_2$-norm as:

$$\min_W \|A_e - WA_p\|_F^2 + \lambda\|W\|_F^2. \qquad (5)$$

This may have a closed-form solution as:

$$W = A_e A_p^T (A_p A_p^T + \lambda I)^{-1}. \qquad (6)$$

After the initialization, similar to K-SVD, a two-step iteration may be implemented for minimizing the energy in Eq. (4), namely, sparse coding for training samples and dictionary updating by SVD method.

Sparse Coding

According to certain embodiments, given D, the step of sparse coding finds the sparse representation $a_j$ for $x_j$, for $j=1, \ldots, n$, by solving:

$$\min_{a_j} \|x_j - Da_j\|_2^2 \qquad (7)$$

$$\text{s.t. } \|a_j\|_0 \le t.$$

where $a_j$ is the $j^{th}$ column of the sparse representation matrix A and $x_j$ is the $j^{th}$ training sample in matrix X. In certain embodiments, there may be various approaches to solve Eq. (7). For instance, certain embodiments may use the orthogonal matching pursuit (OMP), which may be one of the greedy methods for approximation.

As previously noted, according to certain embodiments, the local sparsity constraints imposed on Eq. (4) may affect the direct application of OMP. However, one workaround may be to solve the following problem in Eq. (8) in place of Eq. (4):

$$\min_{D,A} \|X - DA\|_F^2 \qquad (8)$$

$$\text{s.t. } \|a_j\|_0 \le t_e + t_p, j = 1, \ldots, n.$$

where $a_j$ is the vertical concatenation of $a_{+,j}$ and $a_{-,j}$ in Eq. (4), and $t_e$ and $t_p$ are the sparsity constraints for the upper and bottom parts of $a_j$, respectively. During the OMP process in each iteration, the largest sparse coefficients in $a_j$ may be kept to ensure the local sparsity constraints.

According to certain embodiments, during the OMP process in each iteration, a conditional constraint may be imposed, which may include a constrain that if any of the local sparsity is violated, the small coefficients are set to zero and retain the largest sparse coefficients to ensure the local sparsity.

Dictionary Update

According to certain embodiments, to update the $k^{th}$ atom, $d_k$, in dictionary D and its corresponding coefficients, $a_R^k$, in the $k^{th}$ row of A, SVD may be applied to the residue term $R_k \triangleq X - \Sigma_{j \ne k} d_j a_R^j$. In addition, the result of discarding zero entries in $a_R^k$ as $\tilde{a}_R^k$, and correspondingly, $R_k$ as $\tilde{R}_k$. This is to select the training samples that use the atom $d_k$ for consideration and to avoid filling in the zeros entries of $a_R^k$ during the update. The updated atom $d_k$ and the related coefficients $\tilde{a}_R^k$ may then be computed by:

$$\min_{d_k, \tilde{a}_R^k} \|\tilde{R}_k - d_k \tilde{a}_R^k\|_F^2. \qquad (9)$$

To solve Eq. (9), the SVD method may be used on the residue term such as, for example, $\tilde{R}_k = U\Sigma V^T$. Ten, $d_k$ and $\tilde{a}_R^k$ may be updated as follows:

$$d_k = U(:,1),$$

$$a_R^k = \Sigma(1,1)V^T(1,:). \qquad (10)$$

According to certain embodiments, taking D as a whole in the dictionary update phase may lead to a mistake because it may be likely to be filled since the zero matrices part and the identity matrix part in D may not be enforced in the update of the dictionary by SVD. However, in some example embodiments, a remedy to this problem may include decomposing the dictionary update phase into the following two sub-problems by revisiting the matrix from the optimization problem in Eq. (3).

Update $D_e$, $A_e$ $$\langle D_e^*, A_e^* \rangle = \underset{D_e, A_e}{\operatorname{argmin}} \|X_e - D_e A_e\|_F^2. \qquad (11)$$

With the zero entry positions fixed in each row of $A_e$, the atoms in $D_e$ and the corresponding nonzero entries in $A_e$ may be updated by solving Eq. (11) using the same procedure in Eq. (9) and (10). Columns of De may remain $l_2$ normalized.

Update $D_p$, $A_p$, and W:

According to certain embodiments, the updated ECG sparse representation matrix $A_e^*$ from the sub-problem (i) may serve as an input to the second sub-problem here to update W, $D_p$ and $A_p$ in Eq. (12). The formulation may be as follows:

$$\langle D_p^*, A_p^*, W^* \rangle = \underset{D_p, A_p, W}{\operatorname{argmin}} \left\| \begin{pmatrix} \sqrt{\alpha} X_p \\ \sqrt{\beta} A_e^* \end{pmatrix} - \begin{pmatrix} \sqrt{\alpha} D_p \\ \sqrt{\beta} W \end{pmatrix} A_p \right\|_F^2. \qquad (12)$$

Again, the K-SVD algorithm may be applied with zero entries fixed in $A_p$, and $(\sqrt{\alpha}D_p, \sqrt{\beta}W)^T$ may be treated as a whole dictionary term to be updated column-wise with $l_2$ norm remaining unit. Here, the linear transform and the dictionary may be updated simultaneously, which may address the isolated update problem.

After solving the two sub-problems, D and A may be obtained by a simple matrix recombination. According to certain embodiments, the steps of XDJDL may be summarized in Algorithm 1 as shown in FIG. 2.

Signal Preprocessing

Figure 3A:
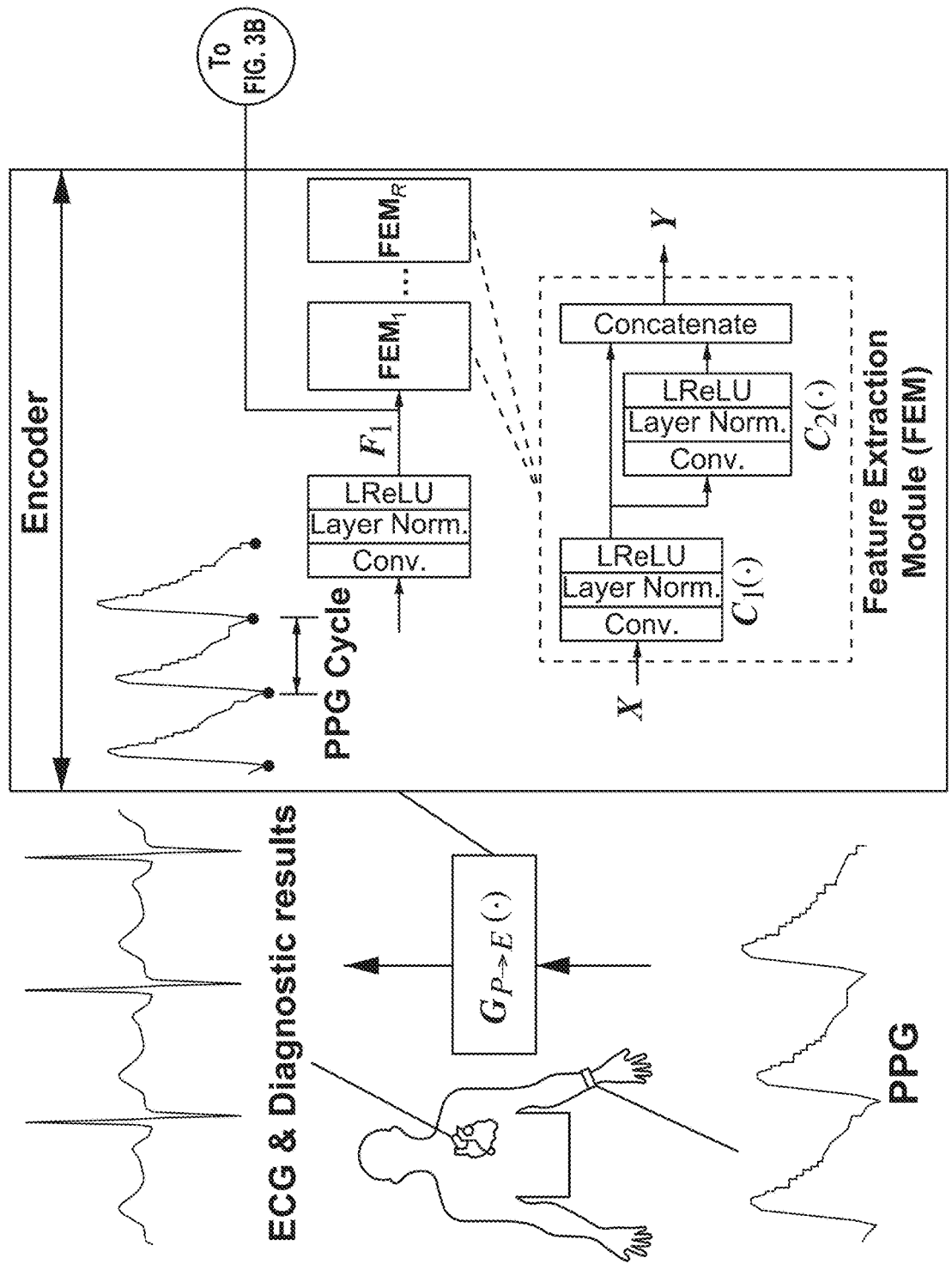
FIGS. 3A and 3B illustrate an example architecture of a neural network for inferring electrocardiogram (ECG) and diagnosing cardiovascular diseases (CVDs), according to certain embodiments.
Figure 3B:
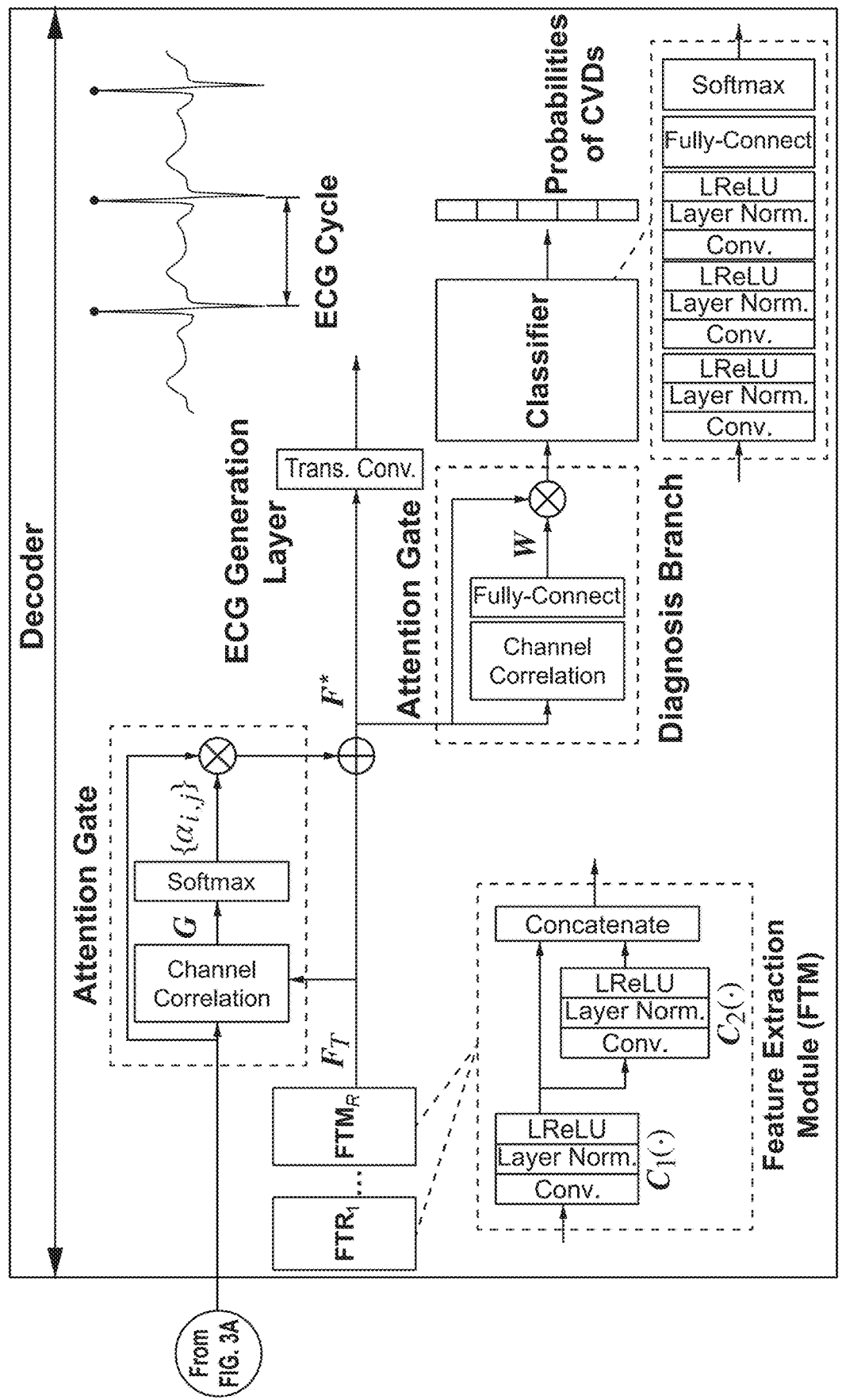

According to certain embodiments, the ECG and PPG sequences may be preprocessed. For example, the moment may be taken when the ventricles contract as the anchor point for PPG-ECG synchronization, where the onset points of PPG are aligned to the R-peaks of ECG. A de-trending algorithm may then be applied on aligned sequences to eliminate the slow-varying trends introduced by breathing, motion, etc. In other embodiments, the de-trended sequences may be partitioned into cycles, wherein each cycle may start at an onset point of PPG or an R-peak of ECG, as shown in FIGS. 3A and 3B. The PPG and ECG cycles may then be interpolated to length L as $P \in \mathbb{R}^L$ and $E \in \mathbb{R}^L$, respectively.

Network Architecture and Training

According to certain embodiments, the neural network may follow an encoder-decoder architecture. For instance, in some embodiments, the decoder may have two branches, one for inferring ECG and the other for diagnosing CVDs. Since the cardiac events within a heartbeat are of different durations, to capture the correlation between the mechanical and electrical activities of these events, the neural network may explore the signal spaces of PPG and ECG at diverse scales. Certain embodiments may provide a multi-scale feature extraction module (FEM) and take it as the encoder's backbone. The architecture of FEM is illustrated in FIGS. 3A and 3B. As illustrated in FIGS. 3A and 3B, the FEMs may be appended at the end of the first convolutional layer one after another. Without loss of generality, the input may be denoted to an FEM by X, and the output may be computed as:

$$Y = [C_1(X), C_2 \circ C_1(X)], \quad (13)$$

where $C_1(\cdot)$ and $C_2(\cdot)$ are the two 1D-convolutional layers, [·] is the concatenation operation along the channel direction. In this example, $C_1(\cdot)$ may first use small-size kernels to analyze the short-time variation of X. The combination effect of $C_2 \circ C_1(\cdot)$ may be leveraged to expand the receptive fields of feature extraction. The concatenated feature map Y may encode the temporal characteristics of PPG detected at two different scales. Additionally, the cascade of multiple FEMs may progressively increase the scale of feature extraction and form a contracting (or down-sampling) pathway in the feature space.

In certain embodiments, the decoder may form an expanding (or up-sampling) pathway, where the bottle-neck feature codes learned from PPG are gradually interpolated to ECG via feature transform modules (FTM). Similar to FEM, FTM may adopt the same multi-scale fusion architecture, while it uses transposed-convolution to increase the resolution of feature map (see FIGS. 3A and 3B). According to certain embodiments, the feed-forward path formed by the cascade of FEMs and FTMs may not be sufficient to guarantee the quality of output ECG. Although stacking FEMs may help to detect the abstract and high-level features of PPG, the down-sampling effect may attenuate the fine details of the input, while PPG's short-term variation contains important cues for inferring ECG. To compensate for the loss of high-resolution features, certain embodiments may bridge the encoder and decoder by an attention gate. As shown in FIGS. 3A and 3B, the feature map learned by the first convolutional layer, which has the highest resolution, may be weighted by the attention gate before fusing with the feature map at the decoder. Take the i-th channel for instance, feature fusion may be conducted as:

$$F^*[i, :] = F_T[i, :] + \sum_{j=1}^{C} \alpha_{i,j} F_i[j, :], i = 1, \ldots, C, \quad (14)$$

where $F_1 \in \mathbb{R}^{C \times V}$ and $F_T \in \mathbb{R}^{C \times V}$ are the feature maps output by the first convolutional layer and the last FTM (see FIGS. 3A and 3B), respectively. Additionally, C is the number of channels, and V is the length of the feature vector in each channel. Further, F* is used for inferring ECG and diagnosing CVDs, and $\{\alpha_{i,j} | i,j=1, \ldots, C\}$ are the weights learned by the attention gate. The attention gate takes $F_1$ and $F_T$ as inputs, and the two channels in $F_1$ and $F_T$ with strong correlation may associate with the same cardiac event According to certain embodiments, the attention gate may first compute the channel-wise correlation coefficients between $F_1$ and $F_T$, giving rise to the matrix $G \in [0,1]^{C \times C}$:

$$G[i, j] = \frac{\langle F_1[i, :], F_T[j, :] \rangle}{\|F_1[i, :]\|_2 \|F_T[j, :]\|_2}, i, j = 1, \ldots, C \quad (15)$$

According to certain embodiments, the weights for the feature fusion may be learned from G using a softmax layer:

$$\alpha_{i,j} = \frac{\exp(\Phi[i, j])}{\sum_{k=1}^{C} \exp(\Phi[i, k])}, i, j = 1, \ldots, C \quad (16)$$

where $\Phi = G \cdot \Theta$, and $\Theta \in \mathbb{R}^{C \times C}$ are learnable parameters. Finally, ECG may be generated by computing the transposed-convolution between the channels of F* and kernels:

$$\hat{E} = \sum_{i=1}^{C} F^*[i, :] * K[i], \quad (17)$$

where * represents the transposed-convolution operator, and K[i] is the i-th 1D-kernel. Eq. (17) forms a C-channel representation of ECG. For better interpretability, it may be desirable in certain embodiments for the neural network to separately synthesize the P-wave, QRS complex, and T-wave of an ECG cycle from different channels of F*. Since these channels may also be used for diagnosing CVDs, disentangled representation can reflect the connection between CVDs and ECG sub-waves, making it easier to understand the decision rules learned by the neural network.

According to certain embodiments, the network may make localized and sparse representation of ECG. In some embodiments, the feature map F* may be divided into non-overlapping groups along the row and column directions, respectively, and the group sparsity ($\ell_1/\ell_2$ norm) may be used to regularize the feature map on both directions. Additionally, in some embodiments, the row-direction sparsity may need each kernel K[i] to activate within a short band in F*[i,:], so that F*[i,:] may associate with only one ECG sub-wave. In certain embodiments, the column-wise sparsity ma prevent the kernels from simultaneously showing large responses at F*[:,j], so it constrains the number of active kernels involved in synthesizing each sub-wave. In this way, the convolutional kernels K[i](i=1, ..., C) may be forced to represent the intrinsic structures of ECG sub-waves. Similarly, the group sparsity constraint may also imposed on the feature map of PPG learned by the first convolutional layer. Thus, the sparsity constraint may be expressed as:

$$\mathcal{L}_S = \sum_{i=1}^{C} \|F^*[i,:]\|_2 + \sum_{j=1}^{V} \|F^*[:,j]\|_2 + \sum_{i=1}^{C} \|F_1[i,:]\|_2 + \sum_{j=1}^{V} \|F_1[:,j]\|_2. \quad (18)$$

As discussed below, according to certain embodiments, the sparsity constraint may allow certain embodiments to identify kernels and compress the network.

According to certain embodiments, the diagnosis branch may accept the sparse feature map F* as input. Some abnormal patterns of ECG may be strong indicators of CVDs. For example, the elevation of the ST segment may indicate a high risk of myocardial ischemia. Since the training algorithm in certain embodiments may force the channels of F* to separately depict the morphologies of different sub-waves, to emphasize the informative ones, a channel-wise attention gate may be incorporated into the diagnosis branch. In particular, the channel weights may be computed from the statistics of each channel, including mean, variance, maximum, and minimum, using a three-layer fully-connected network. The attention gate may output a weight vector $w \in [0,1]^C$, and each channel of F* may be scaled by the corresponding weight as F*[i,:]w[i], (i=1, ..., C). Additionally, the re-calibrated feature map may be fed to a classifier (composed of three convolutional layers and a fully-connected network with softmax output) to infer the probabilities of different kinds of CVDs.

In certain embodiments, taking into account the quality of inferred ECG, the accuracy of CVDs diagnosis, and the sparsity of features maps, the training loss may be formulated as:

$$\mathcal{L} = \|\hat{E}-E\|_2^2 + \lambda_D \text{CrossEntropy}(p,l) + \lambda_S \mathcal{L}_S, \quad (19)$$

where $\hat{E}$ and E are the inferred and ground-truth ECG cycles respectively, $p \in [0,1]^N$ represents the estimated probabilities of N kinds of CVDs, 1 is the one-hot vector indicating the ground-truth disease label, $\lambda_D$ and $\lambda_S$ are weights. In certain embodiments, the cross entropy loss may be used to measure the discrepancy between p and l.

Extension to Semi-Supervised Setting

According to certain embodiments, the training loss in Eq. (19) may need the supervision of ground-truth ECG. However, simultaneously recorded ECG and PPG sequences may account for a small amount of available data. For instance, the long-term PPG recordings of a user may be read out from a smartwatch, while the reference ECG data may not be available. Likewise, a patient wearing a Holter may not simultaneously record PPG data. In some embodiments, when paired training examples are scarce, neural network may bias to the few structural correspondences between ECG and PPG covered by the training set. It may be natural to expect that the training algorithm can exploit the information in the plentiful unpaired ECG and PPG data. As highly structured signals, PPG and ECG may approximately reside on two manifolds with lower dimensions than the signal spaces. The unpaired data may carry rich information about the two manifolds, making full use of which allows neural network to capture the structural priors of PPG and ECG.

In certain embodiments, given a set of paired examples, besides the PPG-to-ECG mapping $G_{P \to E}(\cdot)$, the aforementioned architecture may also be trained to map ECG to PPG [denoted by $G_{E \to P}(\cdot)$]. In some embodiments, $G_{E \to P}(\cdot)$ may be the inverse of $G_{E \to P}(\cdot)$, and vice versa. In other embodiments, the consistency loss may be used to regularize the two mappings. According to certain embodiments, for an unpaired PPG cycle P, sequentially applying $G_{P \to E}(\cdot)$ and $G_{E \to P}(\cdot)$ on P may bring the signal back to its original state, giving rises to the following loss:

$$\mathcal{L}_C = \|P - G_{E \to P} \circ G_{P \to E}(P)\|_2^2. \quad (20)$$

Similarly, given an unpaired ECG cycle E, the following may be obtained:

$$\mathcal{L}_C = \|E - G_{P \to E} \circ G_{E \to P}(E)\|_2^2. \quad (21)$$

According to certain embodiments, Eq. (20) and (21) may be applied on unpaired examples. This work may not use discriminators to regularize $G_{P \to E}(\cdot)$ and $G_{E \to P}(\cdot)$. Rather, the adversarial training may not bring performance improvement in this problem but increases training complexity. In certain embodiments, PPG and ECG may be of less variation than image, and the inferred waveforms may be of high quality and seldom deviate far away from the manifolds. Hence, the regularization effects of discriminators may not be obvious.

Lightweight Variant for Mobile Applications

According to certain embodiments, continuous health monitoring applications may be deployed on mobile devices. Thus, to accommodate the limited memory resource of mobile devices, certain embodiments may provide a lightweight variant of the multi-task architecture by leveraging parameter re-usage and pruning strategies.

In certain embodiments, the neural network may be compressed by removing its redundancies in both architecture and parameters. Architectural redundancy may exist in the cascade of the modules with the same architecture. For both FEM and FTM, if the input and output of an arbitrary module are required to have the same dimension, the feed-forward computation defined by R cascaded modules may be simplified by the R-depth recursion of one module:

$$Y^{(R)} = \underbrace{M \circ \ldots \circ M}_{R}(X), \quad (22)$$

where M(·) represents the module (either FEM and FTM). Taking FEM for example, Eq. (22) is equivalent to repeatedly applying a fixed feature extractor M(·) on the input for R times. In this case, the basic module may be used to extract both low-level and high-level features from X, so that the convolutional kernels may cover the representative patterns of the input at different levels. Since the patterns of PPG and ECG are relatively monotonous, recursion does not noticeably degrade the expressive power of the network.

According to certain embodiments, the two convolutional layers at the two ends of the ECG inference pipeline may be compressed via parameter pruning. Similar to the atoms in sparse coding, the kernels may be trained to extract PPG features and generate ECG, respectively. Due to the sparsity constraints, a few active kernels may play dominant roles in each layer. As such, the norm of a channel in the feature map may reflect the significance of the corresponding kernel. In certain embodiments, it may be safe to remove the inactive kernels whose feature channels constantly show small norms on different inputs. The significance of a kernel may also be quantified by the attention weight assigned to the corresponding channel In other embodiments, each channel of $F_1$ may receive a weight for feature fusion, and each channel of $F^*$ may receive a weight for diagnosing CVDs. Hence, it may be possible to take the feature norm and attention weight as the criteria for kernel pruning. Additionally, taking the i-th kernel at the ECG generation layer for example, its significance score may be computed as:

$$S[i] = \mathbb{E}\{\|F^*[i,:]\|_2^2 + \lambda_w w[i]\}, \quad (23)$$

where $\mathbb{E}[\cdot]$ represents the expectation operator, and $\lambda_w > 0$ balances the two criteria. To identify the trivial kernels, the full network may be pre-trained for several epochs, and the significance score of each kernel may be computed. For both layers, half of the kernels with the highest significance scores may be preserved, and then the pruned network may be fine-tuned on the same training set.

Experimental Evaluation

According to certain embodiments, as an example to illustrate or evaluate certain embodiments described herein, a sample of 33-patents with cardio labels=reconstruction (comparison with other frameworks), may use estimated cycle for reconstruction (XDJDL), classification (XDJDL), and leave-one-out experiment (XDJDL).

A. Dataset and Metrics

The Medical Information Mart for Intensive Care III (MIMIC-III) may be a large database including vital sign measurements at the bedside and the corresponding patients' profile. The database may be publicly available and encompass a large population of ICU patents (e.g., 38,597 distinct adult patients with a median age of 65.8 years, and 7,870 neonates). In this experimental study of the framework and algorithm of certain embodiments, a subset of the MIMIC-III database may be extracted for the performance study when the subjects are with various cardiovascular malfunctions.

For instance, in certain embodiments, waveforms that contain both lead II ECG and PPG signals may be selected and sampled at 125 Hz from folder 35 in MIMIC-III waveform database. Then, the selected waveforms may be cross-referenced with the corresponding patient profile by subject ID. Patients with the four diseases may further be selected: congestive heart failure (CHF), myocardial infarction (MI) including ST-segment elevated (STEMI) and non-ST segment elevated (NSTEMI), hypotension (HYPO), and coronary artery disease (CAD). These diseases may be under the list of "diseases of the circulatory system" in the ICD-9 international disease classification codes. After that, the signal pair quality may be analyzed with the PPG SQI but function from the PhysioNet cardiovascular signal toolbox and retain mainly the pair segments that are evaluated as "acceptable" or "excellent."

According to certain embodiments, the resulting database may include 33 patients, with each patient having one of the four diseases in record. Further, each patient may have three sessions of 5-min ECG and PPG paired recordings collected within several hours, resulting in 35,000+ ECP/PPG cycle pairs in total. The table in FIG. 4 shows the composition of the collected dataset.

According to certain embodiments, the Pearson correlation (ρ) and relative root mean squared error (rRMSE) may be applied as the metrics for ECG reconstruction performance, which are defined in Eq. (24) as follows:

$$\rho = \frac{(x-\bar{x})^T(\hat{x}-\bar{\hat{x}})}{\|x-\bar{x}\|_2 \|\hat{x}-\bar{\hat{x}}\|_2}, \quad (24)$$

$$rRMSE = \frac{\|x-\hat{x}\|_2}{\|x\|_2}.$$

where $y_{test}$, $\bar{y}_{test}$, and $\bar{y}_{test}$ denote the ECG signal in the test set, the average of all coordinates of the vectors $\hat{y}_{test}$ and $y_{test}$, respectively.

B. Experimental Results

Certain embodiments compare the XDJDL method with a discrete cosine transform (DCT) based reconstruction method. To make a fair comparison, the DCT based reconstruction system is evaluated in the subject-independent training mode where one linear transform $W_{DCT}$ is learned using training data from all patients (i.e., the trained model is independent of specific subject). The normalized PPG/ECG cycle length may be selected as d=300. Further, the dictionary size for ECG cycles may be set as $k_e$=320, and the size for the PPG cycles may be set as $k_p$=9,000. Additionally, the sparsity parameters may be set to be $t_e$=10 and $t_p$=10. Further, the weights for regularization terms in Eq. (2) may be set to α=1 and β=1, and the training ratio may be selected as 80%.

FIG. 5 illustrates another table, which shows a comparison of reconstructions in a sample mean ($\hat{\mu}$) and standard deviation ($\hat{\sigma}$) of ρ and rRMSE, according to certain embodiments. In particular, Table II shows the quantitative comparison of the average performance between the DCT method and XDJDL. From the statistics of sample mean, standard deviation, and median of ρ and rRMSE, it can be seen that the XDJDL of certain embodiments outperforms the DCT based algorithm. Specifically, XDJDL gains about 22.5% improvement for the mean Pearson correlation, and reduces the mean rRMSE by about 41.8%.

Figure 6A:
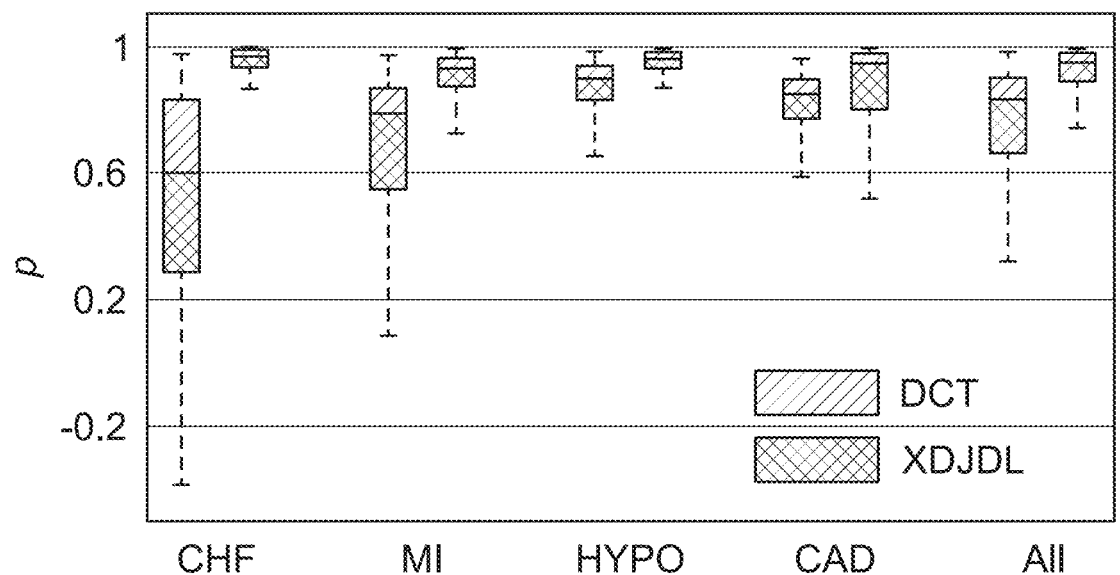
FIG. 6(a) illustrates a comparison between the performance of a discrete cosine transform (DCT) based method and cross-domain joint dictionary learning (XDJDL) related to the statistics of ρ, according to certain embodiments.
Figure 6B:
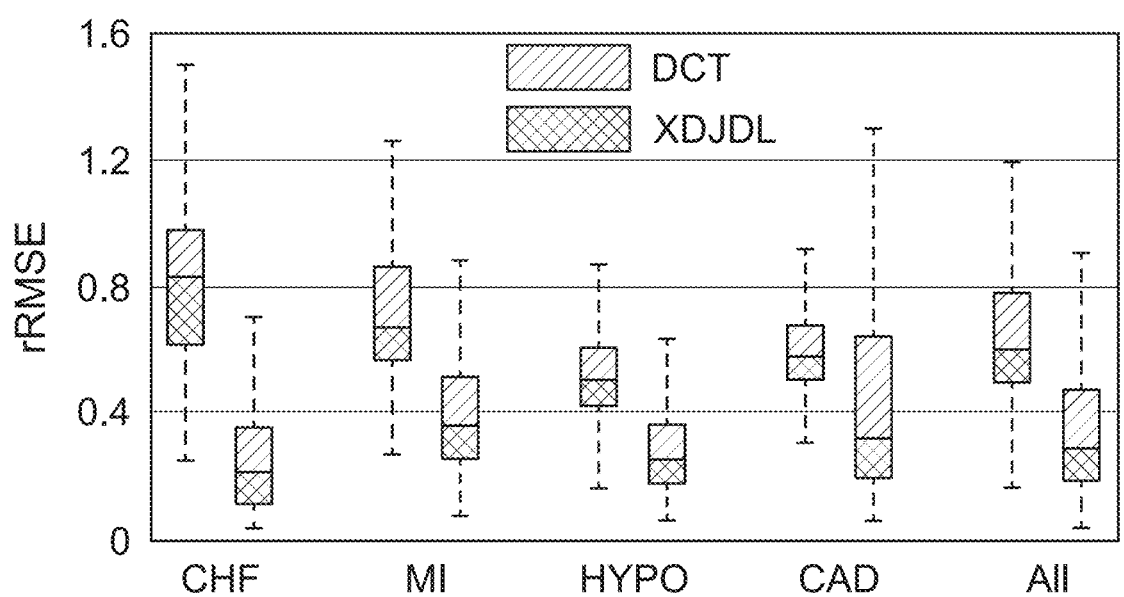
FIG. 6(b) illustrates another comparison between the performance of the DCT based method and XDJDL related to the statistics of rRMSE, according to certain embodiments.

FIG. 6(a) illustrates a comparison between the performance of the DCT based method and XDJDL related to the statistics of ρ, according to certain embodiments. Further, FIG. 6(b) illustrates another comparison between the performance of the DCT based method and XDJDL related to the statistics of rRMSE, according to certain embodiments. Specifically, FIGS. 6(a) and 6(b) illustrate comparisons of the statistics in boxplots with respect to the four different disease types and an overall evaluation. It can be seen that the XDJDL of certain embodiments show a superior reconstruction performance for CHF/MI/HYPO than the DCT based method. For the CAD, the XDJDL of certain embodiments may provide improved median ρ and rRMSE, although the variance of the XDJDL performance may be increased due to a few low quality reconstruction cases. Further, some were caused by the wrong selection of ECG atoms due to the high similarity of their corresponding PPG atoms; some were resulted from the defects of the peak detection algorithm in the cycle segmentation. Nevertheless, from the last group of boxplots of FIGS. 6(a) and 6(b), it may be observed that the overall median ρ of the XDJDL method is about 0.96 compared to about 0.83 of the DCT method. Additionally, the overall median of rRMSE coefficients is about 0.29 from the XDJDL method while that of the DCT based method is about 0.60.

FIG. 7 illustrates a qualitative comparison between the reconstructed ECG signals, according to certain embodiments. In particular, FIG. 7 illustrates a qualitative comparison between the reconstructed ECG signals using the DCT based method and the XDJDL. FIG. 7 also illustrates a zoomed-in version of the 4$^{th}$ cycle from (a) and (b), and illustrates the PPG signal from which the ECG is inferred (e). Furthermore, FIG. 7 illustrates a five-second segment of reconstructed ECG signals using the XDJDL method and DCT based reconstruction method. This is a median-performance case for both methods where the DCT method achieves a mean Pearson coefficient of 0.80 and XDJDL achieves about 0.85. It can also be seen from the plot that for the male patient with CAD at age 44, the reconstructed ECG signals from the DCT method may retain most shape of the original ECG waveform except for the T peaks, where T peak may be downward instead of upward. In comparison, the XDJDL of certain example embodiments preserves the whole ECG waveform shape.

Figure 8A:
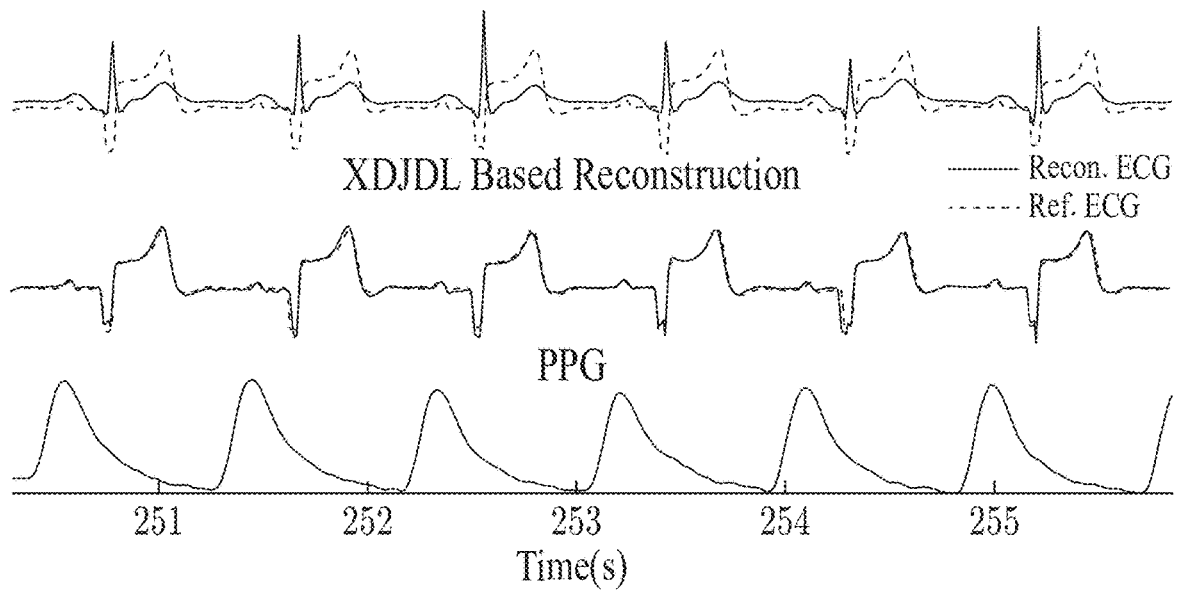
FIG. 8(a) illustrates comparisons between DCT based reconstruction and XDJDL, according to certain embodiments.
Figure 8B:
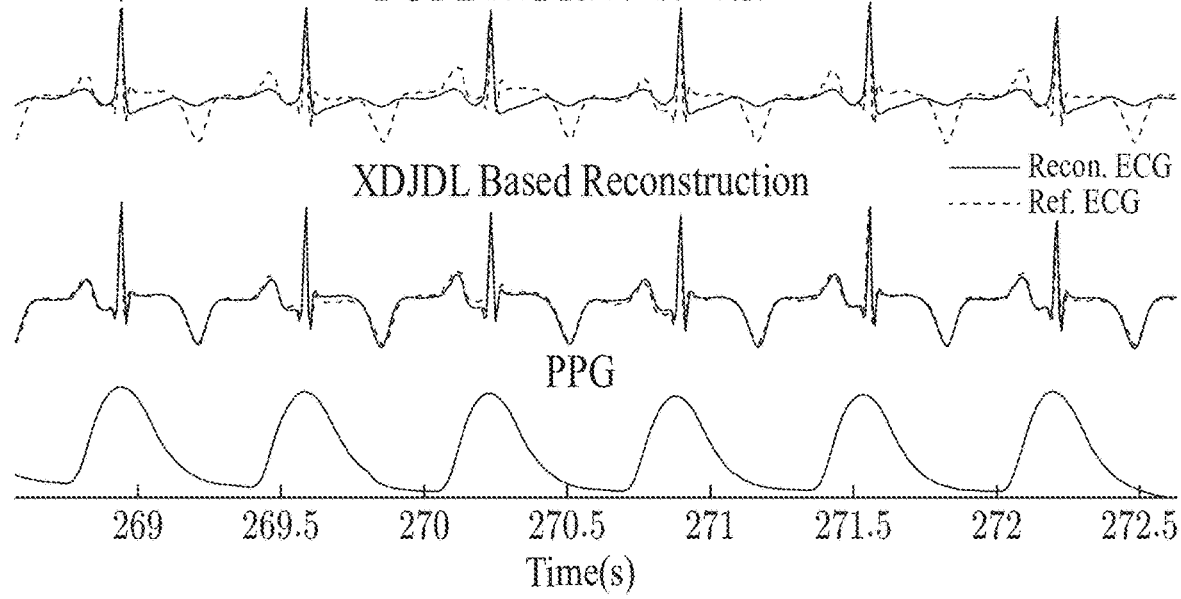
FIG. 8(b) illustrates another comparison between DCT based reconstruction and XDJDL, according to certain embodiments.

FIG. 8(a) illustrates comparisons between DCT based reconstruction (1$^{st}$ row) and XDJDL (2$^{nd}$ row) of a 71-year-old female with CHF, according to certain embodiments. Further, FIG. 8(b) illustrates another comparisons between DCT based reconstruction (1$^{st}$ row) and XDJDL (2$^{nd}$ row) of a 71-year old female with CHF, according to certain embodiments. As illustrated in FIG. 8(a), the comparisons are of an example of a 71-year old female with CHF, where the mean ρ is about 0.94 from the XDJDL method, and 0.19 from the DCT method. As illustrated in FIG. 8(b), the comparisons are of an 87-year-old female with STEMI, where the mean p is about 0.87 from XDJDL and about 0.46 from the DCT method. Additionally, FIGS. 8(a) and 8(b) illustrate two 5-second cases where the DCT based method fails to restore the original ECG waveform when the subjects have more morphologies of the ECG signal. In comparison, the XDJDL method of certain embodiments show a superior performance of ECG recovery with mean Pearson coefficients being about 0.94 and about 0.87 for the first (71-year-old female with CHF) and the second patient (87-year-old female with STEMI), respectively. In addition to the quantitative analysis of the reconstruction performance by Pearson correlation coefficient and rRMSE, certain embodiments may also leverage the disease information embedded in the ECG morphologies and conducted a disease classification experiment based on the reconstructed ECG signals to validate that the XDJDL method has a promising potential in biomedical health informatics.

C. Performance of ECG Inference and CVDs Diagnosis

Figure 10:
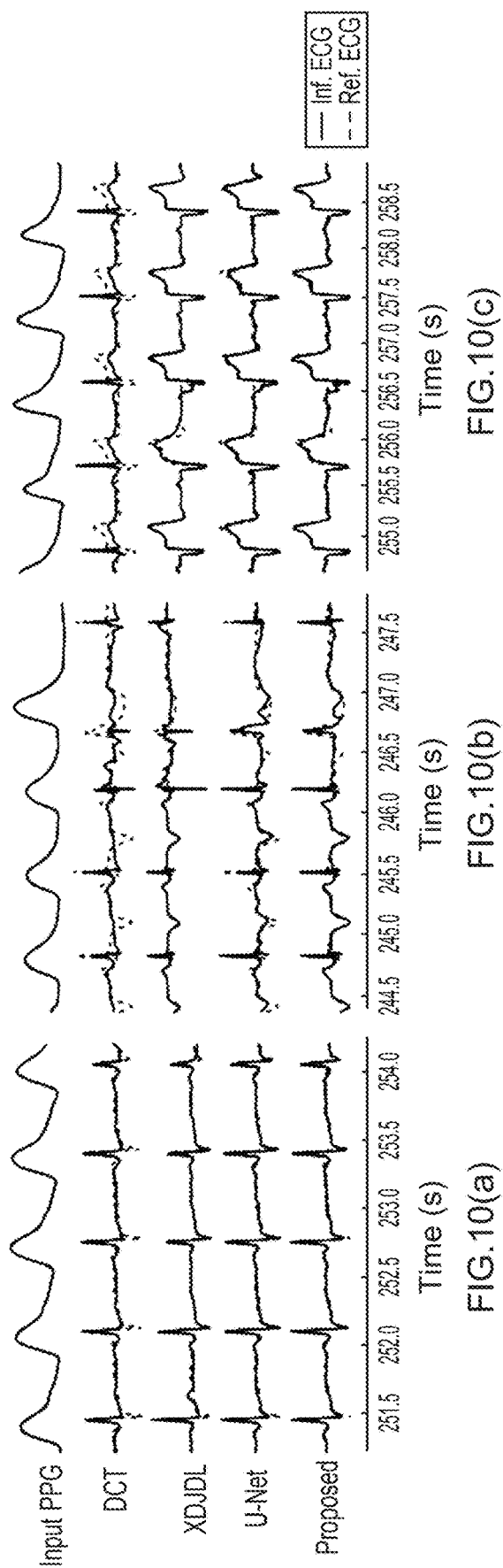
FIG. 10(a) illustrates a comparison of ECG sequences, according to certain embodiments.
FIG. 10(b) illustrates another comparison of ECG, according to certain embodiments.
FIG. 10(c) illustrates a further comparison of ECG, according to certain embodiments.

FIG. 9 illustrates a table that compares the statistics of the quality scores measured from testing algorithms, according to certain embodiments. In particular, FIG. 9 illustrates a table including quantitative performance comparison on the fidelity of inferred ECG. The quantitative comparison demonstrates the superiority of data-driven methods. Compared with the generic orthogonal bases of DCT, the convolutional kernels (or sparse coding atoms) learned from data better suit the underlying structures of ECG. In particular, both metrics indicate that the ECG cycles inferred by the proposed algorithm have the highest fidelity. It can faithfully infer the fine detail and abnormal morphology of ECG, such as the ECG sequence in FIG. 10(a) of CAD, elevated ST-segment in FIG. 10(b), and the inverted QRS complex in FIG. 10(c). Additionally, multi-scale architecture may enable the neural network to be sensitive the subtle difference among PPG waveforms. As can be seen from FIGS. 10(a), 10(b), and 10(c), although the waveforms of PPG may be similar, the network may be able to represent the distinct morphological difference among ECG waveforms.

According to certain embodiments, the diagnostic accuracy of the neural network may be evaluated at the cycle level. In addition, the diagnosis may also be made at the sequence level using majority-voting, which may lead to higher accuracy. Certain embodiments may eliminate the influence of voting on PPG based CVDs diagnosis, so classifications may be conducted at the cycle level. For instance, for each CVD, $F_1$ score may be computed by comparing the probability of this disease estimated by the neural network with a threshold sweeping from 0 to 1 with a step size of $5\times10^{-3}$. FIG. 11 illustrates a table that shows the disease-specific and average accuracies, according to certain embodiments. For all the diseases, the multi-task network may achieve an $F_1$ score higher than 0.95. This result demonstrates the feasibility of automated CVDs diagnosis using easily available PPG data. FIG. 12 illustrates the confusion matrix, according to certain embodiments. The major confusion is between MI and CAD. This result is consistent with the pathological bases of the two diseases since both of them reduce the supply of blood to the heart.

A benefit of joint ECG inference and CVDs diagnosis is that the inferred ECG cycles may help cardiologists make necessary double-check of the model's prediction, since the manual diagnoses of CVDs are mainly based on ECG. The CVDs detection task may force the neural network to be sensitive to the abnormal patterns related to CVDs and, thus, this auxiliary task may be beneficial to ECG inference. To examine the mutual influence between the two tasks, ablation experiments were conducted by dropping one task at a time and assessed the performance of the ablated networks. After dropping CVDs detection, the average rRMSE of ECG inference reached to 0.35. Dropping the ECG inference task may also hurt the accuracy of CVDs detection, and the average $F_1$ score may drop to 0.945 from 0.964.

D. Performance of Semi-Supervised ECG Inference

In certain embodiments, the network may be trained using the semi-supervised scheme. For instance, in certain example embodiments, about 10% of the PPG-ECG pairs may be preserved, and the left ones may all be decoupled. As can be seen in the table of FIG. 13, the semi-supervised training scheme may not be sensitive to decoupling, and may maintain the performance of ECG inference at a reasonable level. In addition, the network trained on the partially paired set shows comparable performance as the one trained on the fully paired set. It may be observed that the PPG inferred by the dual mapping $G_{E \to P}(\cdot)$ from unpaired ECG data show strong agreement with the ground-truths, and they may be viewed as the noisy observations of the real PPG. In this sense, $G_{P \to E}(\cdot)$ and $G_{E \to P}(\cdot)$ may benefit each other by augmenting the training set. This may be equivalent to making denser sampling of the manifolds of PPG and ECG, which may be helpful in modeling the structural variations of ECG and PPG E. Performance of Lightweight Network In certain embodiments, the efficacy of the network compression scheme was examined. Additionally, the lightweight network may take up less than 170 KB of memory, which may ease the deployment on mobile devices, while the reduction of parameters does not incur remarkable performance degradation. In other embodiments, the techniques described herein may be applied to a neural network structure for further optimization in terms of the desirable tradeoffs among computational complexity, memory usage, accuracy of learning, and other relevant criteria.

Implementation

The neural network and the one-dimensional U-Net of certain embodiments were implemented in Pytorch. The networks were trained using the Adam optimization algorithm for 40 epochs with parameters $\beta_1=0.9$, $\beta_2=0.999$, and $\varepsilon=10^{-8}$. The initial learning rate was set to $5\times10^{-4}$ and then decreased to $10^{-4}$ after 20 epochs. The batch size was set to 10, and the weights in the objective function are $\lambda_D=0.1$ and $\lambda_S=5\times10^{-6}$. The criterion for setting these weights may be to balance the loss terms. Training the network was performed on a workstation with Intel i7-6850K 3.60 GHz CPU, 32 GB memory, and 1080Ti GPU took 49 min FIG. 14 illustrates a table that lists the detailed parameter settings of the network, according to certain embodiments. Certain embodiments may use ($N_{in}$, $N_{out}$, K, S) to represent the parameters of a convolutional layer or a transposed-convolutional layer, where $N_{in}$ and $N_{out}$ are the channel numbers of the input and output feature maps, respectively, K is the length of kernel, and S is the stride. Further, layer normalization may be applied to all the convolutional and transposed-convolutional layers except the final ECG generation layer.

According to certain embodiments, the lightweight variant of the neural network may adopt recursive FEM and FTM). For instance, the parameters of the two convolutional (or transposed-convolution) layers, $C_1(\cdot)$ and $C_2(\cdot)$, in a recursive module were set to ensure that the input and output have the same dimension. FIG. 15 illustrates a table showing the parameter settings of the recursive FEM and FTM, according to certain embodiments. To match the cascaded modules in the full network, the recursive modules may use 2-depth recursion. After pruning the kernels at the first convolutional layer and the ECG generation layer of the full network, the cascaded FEMs and FTMs may be replaced by the recursive ones and then the network may be fine-tuned for 20 epochs.

Figure 16:
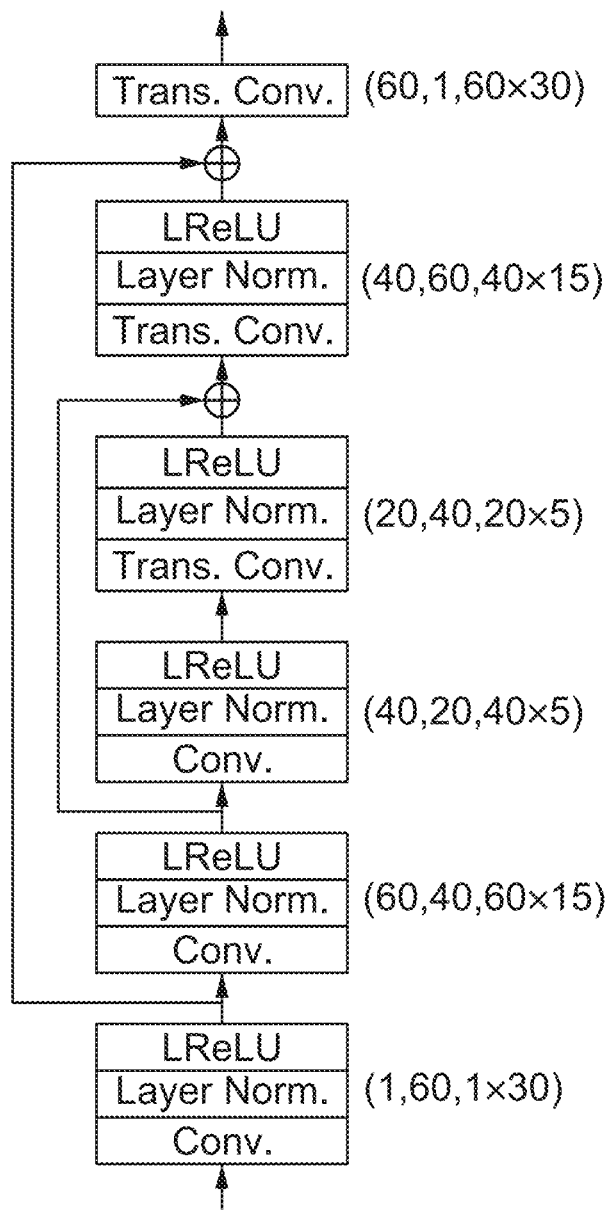
FIG. 16 illustrates a U-Net architecture, according to certain embodiments.

FIG. 16 illustrates a U-Net architecture, according to certain embodiments. In certain embodiments, the encoder and decoder may be composed of three convolutional and transposed-convolutional layers, respectively. Every two mirrored layers at the encoder and decoder may be connected by element-wise summation. Additionally, the kernel sizes may be set to match those of the proposed network, as shown in the table of FIG. 17.

Figure 18:
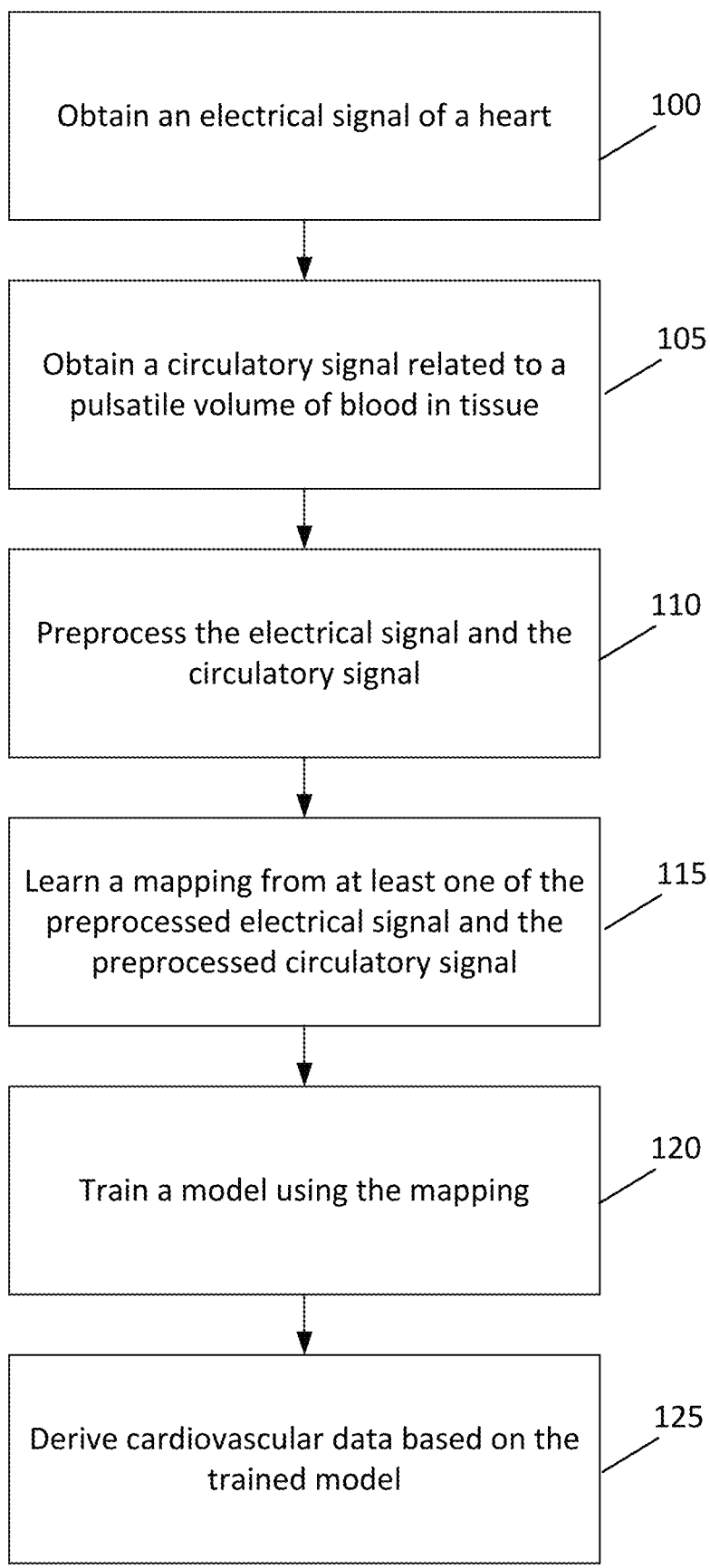
FIG. 18 illustrates an example flow diagram of a method, according to certain embodiments.

FIG. 18 illustrates an example flow diagram of a method, according to certain example embodiments. In certain example embodiments, the flow diagram of FIG. 18 may be performed by a system that includes an ECG apparatus, a PPG apparatus, and a computer apparatus. According to certain embodiments, each of these apparatuses of the system may be represented by, for example, an apparatus similar to apparatus 10 illustrated in FIG. 19.

According to one example embodiment, the method of FIG. 18 may include, at 100, obtaining an electrical signal of a heart. At 105, the method may include obtaining a circulatory signal related to a pulsatile volume of blood in tissue. At 110, the method may include preprocessing the electrical signal and the circulatory signal. At 115, the method may include learning a mapping from at least one of the preprocessed electrical signal and the preprocessed circulatory signal. At 120, the method may include training a model using the mapping. Further, at 125, the method may include deriving cardiovascular data based on the trained model.

According to certain embodiments, the training may include jointly updating the representation and the mapping with another mapping related to sparse representations of the electrical signal and the circulatory signal. According to other embodiments, the method may also include performing a sparse coding of the electrical signal and the circulatory signal to find the sparse representations. According to some embodiments, the preprocessing includes obtaining a temporally aligned and normalized cycle pair of the electrical signal and the circulatory signal.

In certain embodiments, the method may also include mapping the circulatory signal to the electrical signal. In other embodiments, the learning may include implementing a neural network architecture configured to process the preprocessed electrical signal. In some embodiments, the preprocessed electrical signal may be processed by the neural network including an encoder, a decoder, and a connection bridging the encoder and the decoder.

Figure 19:
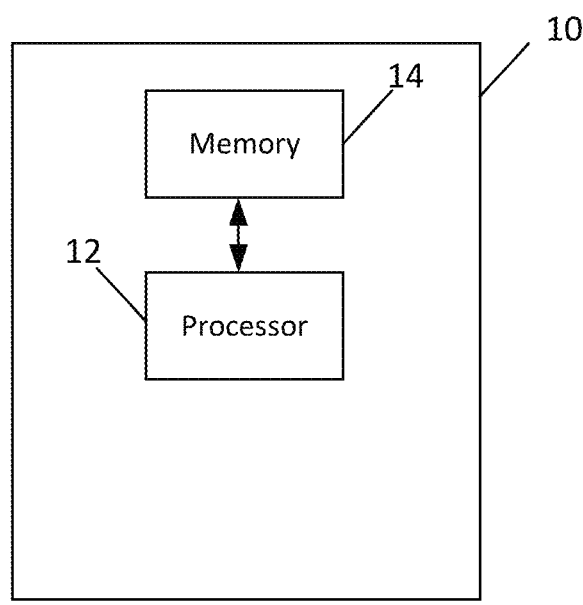
FIG. 19 illustrates an apparatus, according to certain embodiments.

FIG. 19 illustrates an apparatus 10 according to an example embodiment. Although only one apparatus is illustrated in FIG. 19, the apparatus may represent multiple apparatus as part of a system or network. For example, in certain embodiments, apparatus 10 may be an ECG apparatus, PPG apparatus, or computer apparatus that operate individually or together as a system.

In some embodiments, the functionality of any of the methods, processes, algorithms or flow charts described herein may be implemented by software and/or computer program code or portions of code stored in memory or other computer readable or tangible media, and executed by a processor.

For example, in some embodiments, apparatus 10 may include one or more processors, one or more computer-readable storage medium (for example, memory, storage, or the like), one or more radio access components (for example, a modem, a transceiver, or the like), and/or a user interface. It should be noted that one of ordinary skill in the art would understand that apparatus 10 may include components or features not shown in FIG. 19.

As illustrated in the example of FIG. 19, apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 19, multiple processors may be utilized according to other embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-18.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-18.

Additionally or alternatively, in some embodiments, apparatus 10 may include an input and/or output device (I/O device). In certain embodiments, apparatus 10 may further include a user interface, such as a graphical user interface or touchscreen.

In certain embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, processor 12 and memory 14 may be included in or may form a part of processing circuitry or control circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware.

According to certain embodiments, apparatus 10 may be controlled by memory 14 and processor 12 to perform functions associated with example embodiments described herein. For instance, in certain embodiments, apparatus 10 may be controlled by memory 14 and processor 12 to obtain an electrical signal of a heart. Apparatus 10 may also be controlled by memory 14 and processor 12 to obtain a circulatory signal related to a pulsatile volume of blood in tissue. Apparatus 10 may further be controlled by memory 14 and processor 12 to preprocess the electrical signal and the circulatory signal. In addition, apparatus 10 may be controlled by memory 14 and processor 12 to learn a mapping from at least one of the preprocessed electrical signal and the preprocessed circulatory signal. Apparatus 10 may also be controlled by memory 14 and processor 12 to train a model using the mapping. Further, apparatus 10 may be controlled by memory 14 and processor 12 to derive cardiovascular data based on the trained model.

Certain example embodiments may be directed to an apparatus that includes means for obtaining an electrical signal of a heart. The apparatus may also include means for obtaining a circulatory signal related to a pulsatile volume of blood in tissue. The apparatus may further include means for preprocessing the electrical signal and the circulatory signal. In addition, the apparatus may include means for learning a mapping from at least one of the preprocessed electrical signal and the preprocessed circulatory signal. The apparatus may also include means for training a model using the mapping. Further, the apparatus may include means for deriving cardiovascular data based on the trained model.

Certain embodiments described herein provide several technical improvements, enhancements, and/or advantages. In some example embodiments, it may be possible to provide a cross-domain joint dictionary learning (XDJDL) framework for ECG waveform synthesis from the PPG signal. The XDJDL may incorporate a linear mapping error in the sparse domain to the objective function for dictionary pair learning. In addition, certain embodiments may provide an optimal solution by K-SVD to jointly optimize the ECG/PPG dictionary pair and the linear transform. In addition, as described herein, the experimental results show that the approach of certain embodiments yields superior performance to state-of-the-art methods, especially when the dataset covers a wide range of ECG morphologies from different types of cardiovascular disease. The results also reveal that certain embodiments may realize long-term and user-friendly ECG monitoring and screening for preliminary diagnosis economically from PPG signals, which may acquire from daily use of a wrist watch or finger clip oximeter. In other embodiments, it may be possible to provide a system and method that utilizes dictionary learning and deep learning to improve the accuracy of the measurements. By reducing the impact on a user's activity, the system of certain embodiments may result in more accurate measurements than traditional wearable devices.

Other embodiments may provide a system and method that employs a series of transforms that predict an ECG waveform from a measured PPG cycle with high accuracy. Such a system and method may enable continuous, unobtrusive monitoring and analysis of several vital signs, including, but not limited to, heart rate, heart rate variability, respiration rate, blood oxygen saturation, blood pressure, and vascular function Further embodiments may provide a deep learning based approach for user-friendly and continuous cardiac monitoring. In particular, certain embodiments may provide a network that can capture the correlation between PPG and ECG, and detect CVDs by learning from partially paired training examples. As such, certain embodiments may validate that the dynamics of blood flow may provide essential information about the cardiovascular system. Certain embodiments may also provide interpretation results that demonstrate that the influence of cardiac events on blood flow may be uneven, and the changing rate of blood flow and its variation may be of high diagnostic value. In addition, some embodiments may enhance the robustness and generalization of the PPG-based cardiac monitoring.

A computer program product may include one or more computer-executable components which, when the program is run, are configured to carry out some example embodiments. The one or more computer-executable components may be at least one software code or portions of it. Modifications and configurations required for implementing functionality of certain example embodiments may be performed as routine(s), which may be implemented as added or updated software routine(s). Software routine(s) may be downloaded into the apparatus.

As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to an example embodiment, an apparatus, such as a device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments.

PARTIAL GLOSSARY

CVD Cardiovascular Disease
DCT Discrete Cosine Transform
ECG Electrocardiogram
PPG Photoplethysmogram
XDJDL Cross-Domain Joint Dictionary Learning

We claim:

1. A method for cardiovascular monitoring and analytics, comprising:
    obtaining an electrical signal of a heart;
    obtaining a circulatory signal related to a pulsatile volume of blood in tissue;
    preprocessing the electrical signal and the circulatory signal during which the electrical signal and the circulatory signal are aligned;
    jointly learning, by implementing a transform-aware training procedure, a dictionary pair from the preprocessed electrical signal and the preprocessed circulatory signal along with a linear transform between sparse representations of the preprocessed electrical signal and the preprocessed circulatory signal to reveal an intrinsic relationship between the preprocessed electrical signal and the preprocessed circulatory signal;
    performing, by the transform-aware training procedure, a sparse coding of the electrical signal and the circulatory signal to obtain sparse representations of the electrical signal and the circulatory signal;
    determining, by the transform-aware training procedure, mapping errors between the original and approximated signals to enforce the sparse representation of the electrical signal and the sparse representation of the circulatory signal;
    training, by the transform-aware training procedure, a model using the learned dictionary pair by jointly updating a representation of the electrical signal and the circulatory signal;
    reconstructing, by the transform-aware training procedure, the electrical signal based on the trained model;
    providing, by the transform-aware training procedure, automated cardiovascular disease analysis capability based on the trained model and the reconstructed electrical signal;
    obtaining a screening or diagnosis result determined by the automated cardiovascular disease analysis capability; and
    providing the reconstructed electrical signal and the screening or diagnosis result to a user interface to double-check the reconstructed electrical signal and the result.

2. The method according to claim 1, wherein the preprocessing comprises:
    obtaining a temporally aligned and normalized cycle pair of the electrical signal and the circulatory signal.

3. The method according to claim 1, further comprising:
    mapping the circulatory signal to the electrical signal,
    wherein the mapping spans two feature domains.

4. The method according to claim 1, wherein the preprocessed electrical signal is processed by a neural network architecture comprising an encoder, a decoder, and a connection bridging the encoder and the decoder.

5. An apparatus, comprising:
    at least one processor; and
    at least one memory comprising computer program code,
    wherein the at least one memory and the computer program code are configured, with the at least one processor, to cause the apparatus at least to:
    obtain an electrical signal of a heart;
    obtain a circulatory signal related to a pulsatile volume of blood in tissue;
    preprocess the electrical signal and the circulatory signal during which the electrical signal and the circulatory signal are aligned;
    jointly learn, by implementing a transform-aware training procedure, a dictionary pair from the preprocessed electrical signal and the preprocessed circulatory signal along with a linear transform between sparse representations of the preprocessed electrical signal and the preprocessed circulatory signal to reveal an intrinsic relationship between the preprocessed electrical signal and the preprocessed circulatory signal;
    perform, by the transform-aware training procedure, a sparse coding of the electrical signal and the circulatory signal to obtain sparse representations of the electrical signal and the circulatory signal;
    determine, by the transform-aware training procedure, mapping errors between the original and approximated signals to enforce the sparse representation of the electrical signal and the sparse representation of the circulatory signal;
train, by the transform-aware training procedure, a model using the learned dictionary pair by jointly updating a representation of the electrical signal and the circulatory signal;
reconstruct, by the transform-aware training procedure, the electrical signal based on the trained model;
provide, by the transform-aware training procedure, automated cardiovascular disease analysis capability based on the trained model and the reconstructed electrical signal;
obtain a screening or diagnosis result determined by the automated cardiovascular disease analysis capability; and
provide the reconstructed electrical signal and the screening or diagnosis result to a user interface to double-check the reconstructed electrical signal and the result.

6. The apparatus according to claim 5, wherein during the preprocessing, the at least one memory and the computer program code are further configured, with the at least one processor, to cause the apparatus at least to:
obtain a temporally aligned and normalized cycle pair of the electrical signal and the circulatory signal.

7. The apparatus according to claim 5, wherein the at least one memory and the computer program code are further configured, with the at least one processor, to cause the apparatus at least to:
map the circulatory signal to the electrical signal,
wherein the mapping spans two feature domains with low waveform correlation.

8. The apparatus according to claim 5, wherein the preprocessed electrical signal is processed by a neural network architecture comprising an encoder, a decoder, and a connection bridging the encoder and the decoder.

9. A non-transitory computer readable medium encoded with instructions that, when executed in hardware, perform a process, the process comprising:
obtaining an electrical signal of a heart;
obtaining a circulatory signal related to a pulsatile volume of blood in tissue;
preprocessing the electrical signal and the circulatory signal during which the electrical signal and the circulatory signal are aligned;
jointly learning, by implementing a transform-aware training procedure, a dictionary pair from a the preprocessed electrical signal and the preprocessed circulatory signal along with a linear transform between sparse representations of the preprocessed electrical signal and the preprocessed circulatory signal to reveal an intrinsic relationship between the preprocessed electrical signal and the preprocessed circulatory signal;
performing, by the transform-aware training procedure, a sparse coding of the electrical signal and the circulatory signal to obtain sparse representations of the electrical signal and the circulatory signal;
determining, by the transform-aware training procedure, mapping errors between the original and approximated signals to enforce the sparse representation of the electrical signal and the sparse representation of the circulatory signal;
training, by the transform-aware training procedure, a model using the learned dictionary pair by jointly updating a representation of the electrical signal and the circulatory signal;
reconstructing, by the transform-aware training procedure, the electrical signal based on the trained model;
providing, by the transform-aware training procedure, automated cardiovascular disease analysis capability based on the trained model and the reconstructed electrical signal;
obtaining a screening or diagnosis result determined by the automated cardiovascular disease analysis capability; and
providing the reconstructed electrical signal and the screening or diagnosis result to a user interface to double-check the reconstructed electrical signal and the result.

10. The non-transitory computer readable medium according to claim 9, wherein the non-transitory computer readable medium is encoded with instructions that, when executed in hardware, further performs a process that comprises:
during the preprocessing, obtaining a temporally aligned and normalized cycle pair of the electrical signal and the circulatory signal.

11. The non-transitory computer readable medium according to claim 9, wherein the non-transitory computer readable medium is encoded with instructions that, when executed in hardware, further performs a process that comprises: during the preprocessing, preprocessing the electrical signal by a neural network architecture comprising an encoder, a decoder, and a connection bridging the encoder and the decoder.

* * * * *